(12) United States Patent
Kim et al.

(10) Patent No.: US 8,548,479 B2
(45) Date of Patent: Oct. 1, 2013

(54) APPARATUS AND METHOD FOR TRANSMITTING INTER-WORKING SIGNAL IN WIRELESS COMMUNICATION SYSTEM

(75) Inventors: Yung-Soo Kim, Seongnam-si (KR); Ju-Mi Lee, Seoul (KR); Jong-Hyung Kwun, Seongnam-si (KR); Jae-Hee Cho, Seoul (KR); Young-Bo Cho, Seongnam-si (KR); Byung-Wook Jun, Seoul (KR); Young-Hyun Jeon, Guri-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 264 days.

(21) Appl. No.: 12/583,934

(22) Filed: Aug. 28, 2009

(65) Prior Publication Data
US 2010/0056160 A1 Mar. 4, 2010

(30) Foreign Application Priority Data

Aug. 28, 2008 (KR) .................. 10-2008-0084704
Nov. 7, 2008 (KR) .................. 10-2008-0110661

(51) Int. Cl.
*H04W 36/00* (2009.01)
(52) U.S. Cl.
USPC .......................................... 455/444; 370/331
(58) Field of Classification Search
USPC ........................... 455/436, 444; 370/331
See application file for complete search history.

(56) References Cited

U.S. PATENT DOCUMENTS

| | | | | |
|---|---|---|---|---|
| 6,381,230 B1 * | 4/2002 | Wheatley et al. | ............. | 370/328 |
| 2006/0028976 A1 * | 2/2006 | Park et al. | ..................... | 370/203 |
| 2007/0066329 A1 * | 3/2007 | Laroia et al. | .................. | 455/502 |
| 2007/0254620 A1 * | 11/2007 | Lindqvist et al. | ............. | 455/403 |

FOREIGN PATENT DOCUMENTS

| | | |
|---|---|---|
| KR | 10-2006-0002690 | 1/2006 |
| KR | 1020090012478 A | 2/2009 |
| KR | 1020100025646 A | 3/2010 |

OTHER PUBLICATIONS

Notice of Patent Grant dated May 16, 2013 in connection with Korean Patent Application No. 10-2008-0110661, 6 pages.

* cited by examiner

*Primary Examiner* — Marcos Batista

(57) ABSTRACT

A Base Station (BS) includes an apparatus and method for transmitting cell information. The BS is in the a communication system of a small cell size in a wireless communication environment in which a communication system of a large cell size and the communication system of the small cell size are hierarchically constructed in the same area. The method includes confirming reference signal transmission information for transmitting a reference signal including its own cell information, if a reference signal transmission interval arrives according to the reference signal transmission information, transmitting the reference signal through an operation frequency of a macro BS of the large cell size including the BS itself, and, if it is not the reference signal transmission interval, providing service through its own operation frequency or operating in a power saving mode.

20 Claims, 27 Drawing Sheets

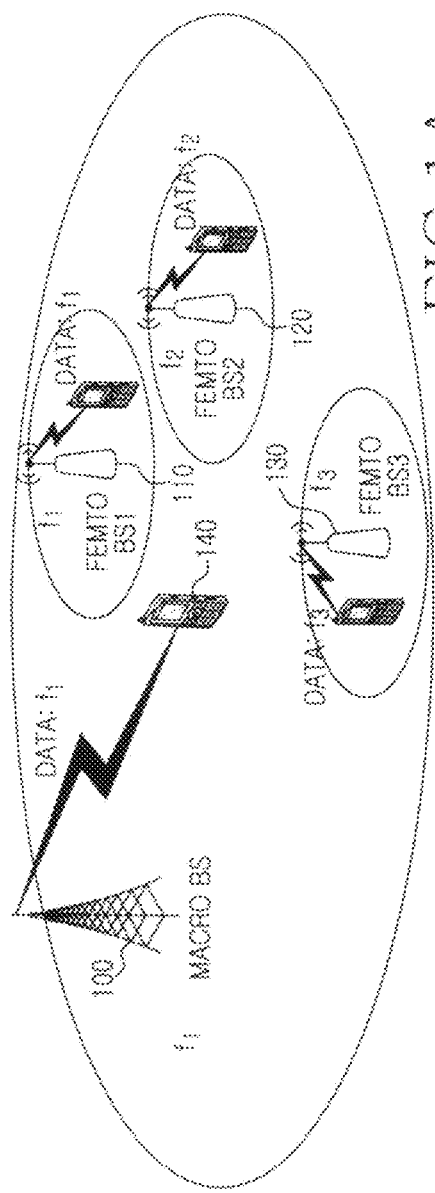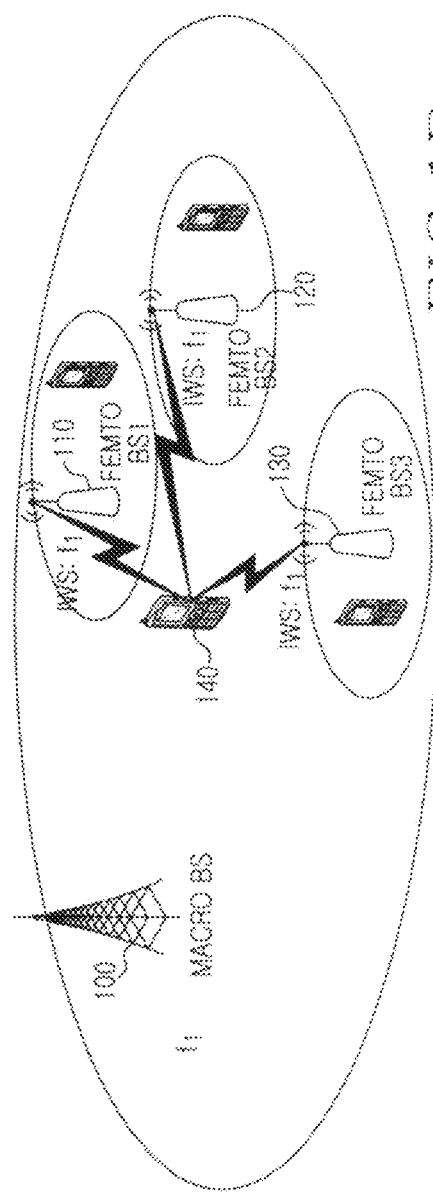

○ : PILOT ically, one aspect of the present invention is to provide an
APPARATUS AND METHOD FOR TRANSMITTING INTER-WORKING SIGNAL IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Aug. 28, 2008 and assigned Serial No. 10-2008-0084704 and a Korean Patent Application filed in the Korean Intellectual Property Office on Nov. 7, 2008 and assigned Serial No. 10-2008-0110661 the contents of which are herein incorporated by reference.

TECHNICAL FIELD OF THE INVENTION

The present invention relates to a wireless communication system in which cells of service areas of different sizes are mixed and managed. More particularly, the present invention relates to an apparatus and method for transmitting/receiving an InterWorking Signal (IWS) such that a Mobile Station (MS) can handover between the cells of service areas of different sizes in the wireless communication system.

BACKGROUND OF THE INVENTION

In some circumstances, an MS of a wireless communication system can communicate more smoothly with a neighbor Base Station (BS) than a serving BS by reason of a change of its own position, a change of a radio environment, a change of the number of subscriber MSs within a cell, and so forth. In this case, the MS, the serving BS, and the neighbor BS recognize a change of a communication environment and perform a Handover (HO) procedure for establishing a new communication path such that the MS smoothly communicates. For example, if a strength of a signal of the MS received from the neighbor BS is greater than a strength of a signal received from the serving BS, the MS performs handover to a cell administered by the neighbor BS. In the following description, a serving cell denotes a cell administered by the serving BS, and a neighbor cell denotes the cell administered by the neighbor BS.

When performing handover to the neighbor cell, the MS needs neighbor cell information such as a frequency of the neighbor cell, a bandwidth, a cell IDentifier (ID), a preamble sequence index, and the like. Thus, the serving BS transmits information regarding its own neighbor cells to MSs located in its service area in order to help the MSs to handover.

In a general wireless communication environment, six to twelve neighbor cells can be located around one cell. Thus, an amount of neighbor cell information transmitted from a serving BS to an MS is not much, thus having no great influence on communication efficiency.

In a wireless communication environment where cells of service areas of different sizes are mixed, there are neighbor cells of service areas of the same size and neighbor cells of service areas of different sizes around one cell. For example, there are different neighbor macro cells and neighbor Femto cells around one macro cell.

In this case, there is a problem in that an amount of neighbor cell information transmitted from a serving BS to an MS increases, thus having bad influence on communication efficiency.

Also, the number of neighbor cells to which the MS can handover increases and thus, the MS can perform scanning throughout a serving cell area. While performing the scanning, the MS is interrupted in communication with the serving BS and thus, there is a problem that the scanning operation results in deterioration of communication efficiency.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, one aspect of the present invention is to provide an apparatus and method for reducing an overhead of neighbor cell information for handover of an MS in a wireless communication system in which cells of service areas of different sizes are mixed and managed.

Another aspect of the present invention is to provide an apparatus and method for transmitting time information at which a MS is to handover from a cell of a large service area to a cell of a small service area in a wireless communication system in which cells of service areas of different sizes are mixed and managed.

In another aspect of the present invention is to provide an apparatus and method for transmitting, to an MS, information for performing handover to a cell of a small service area using an IWS in a wireless communication system in which cells of service areas of different sizes are mixed and managed.

In yet another aspect of the present invention is to provide a BS apparatus of a cell of a service area of a small size and an operation method of the BS, for transmitting an IWS for the sake of handover of an MS in a wireless communication system in which cells of service areas of different sizes are mixed and managed.

In a further aspect of the present invention is to provide an MS apparatus and an operation method of the MS, for acquiring handover information through an IWS transmitted by a BS of a cell of a service area of a small size in a wireless communication system in which cells of service areas of different sizes are mixed and managed.

In still another aspect of the present invention is to provide an MS apparatus and an operation method of the MS, for acquiring identifier information of a target BS through an IWS transmitted by a BS of a cell of a service area of a small size in a wireless communication system in which cells of service areas of different sizes are mixed and managed.

In still yet another aspect of the present invention is to provide a BS apparatus and an operation method of the BS, for transmitting power saving mode information using an IWS in a wireless communication system in which cells of service areas of different sizes are mixed and managed.

In still yet another aspect of the present invention is to provide an MS apparatus and an operation method of the MS, for acquiring power saving mode information of a BS of a cell of a service area of a small size through an IWS in a wireless communication system in which cells of service areas of different sizes are mixed and managed.

In still yet another aspect of the present invention is to provide an apparatus and method, for making a BS transit from a power saving mode to an active mode in a wireless communication system in which cells of service areas of different sizes are mixed and managed.

The above aspects are achieved by providing an apparatus and method for transmitting of an interworking signal in a wireless communication system.

According to one aspect of the present invention, a method for transmitting cell information in a BS of a small cell size in a wireless communication environment in which a communication system of a large cell size and the communication system of the small cell size are hierarchically constructed in the same area is provided. The method includes confirming reference signal transmission information for transmitting a reference signal including its own cell information, if a reference signal transmission interval arrives according to the reference signal transmission information, transmitting the reference signal through an operation frequency of a macro BS of the large cell size, and, if it is not the reference signal transmission interval, providing service through its own operation frequency or operating in a power saving mode, wherein, the BS is located within the service area of the macro BS.

According to another aspect of the present invention, a method for handover of a MS in a wireless communication environment in which a communication system of a large cell size and a communication system of a small cell size are hierarchically constructed in the same area is provided. The method includes accessing a macro BS of the large cell size and communicating with the macro BS, if receiving a reference signal including cell information from a BS of the small cell size through an operation frequency of the macro BS, acquiring the cell information of the BS of the small cell size through the reference signal, performing handover to the BS of the small cell size using the cell information, and, if failing to receive the reference signal through the operation frequency of the macro BS, maintaining an access with the macro BS.

According to a further aspect of the present invention, an apparatus for transmitting cell information in a BS of a small cell size in a wireless communication environment in which a communication system of a large cell size and the communication system of the small cell size are hierarchically constructed in the same area is provided. The apparatus includes a reference signal generator, a scheduler, and a transmitter. The reference signal generator generates a reference signal including its own cell information. If it is not a reference signal transmission interval, the scheduler schedules to provide service through its own operation frequency or operate in a power saving mode and, during the reference signal transmission interval, schedules to transmit the reference signal through an operation frequency of a macro BS of the large cell size including the BS itself. The transmitter transmits the reference signal through the operation frequency of the macro BS during the reference signal transmission interval according to the scheduling information.

According to a yet another aspect of the present invention, an apparatus for handover of an MS in a wireless communication environment in which a communication system of a large cell size and a communication system of a small cell size are hierarchically constructed in the same area is provided. The apparatus includes a receiver, a transmitter, a reference signal analyzer, and a controller. The receiver receives a signal. The transmitter transmits a signal. When accessing a macro BS and communicating with the macro BS, if receiving a reference signal including cell information from a BS of the small cell size through an operation frequency of the macro BS, the reference signal analyzer acquires cell information of the BS of the small cell size through the reference signal. If acquiring the cell information from the reference signal analyzer, the controller controls to handover to the BS of the small cell size using the cell information and, if failing to receive the reference signal, controls to maintain an access with the macro BS.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B illustrate diagrams of a construction of a wireless communication system in which cells of service areas of different sizes are mixed and managed according to an exemplary embodiment of the present invention;

DETAILED DESCRIPTION OF THE INVENTION

Figure 2:
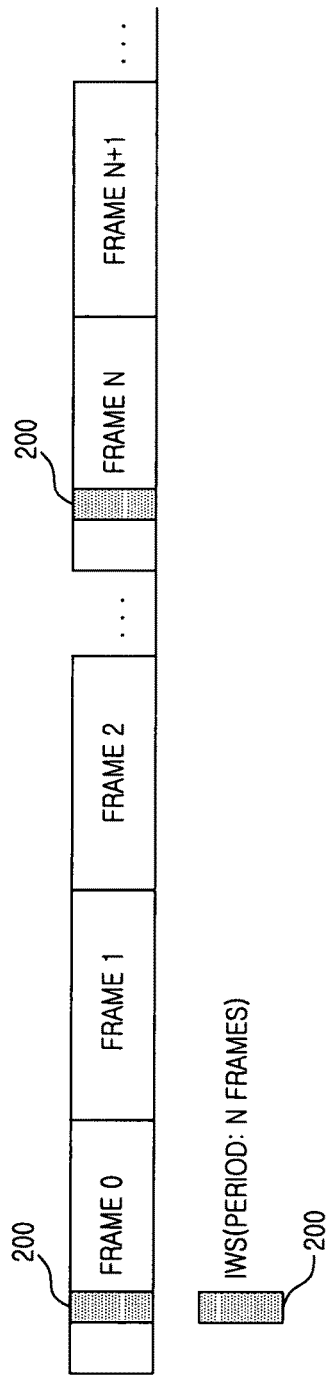
FIG. 2 illustrates a diagram of a frame structure including an InterWorking Signal interval according to an exemplary embodiment of the present invention.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A technology for transmitting an IWS in a wireless communication system in which cells of service areas of different sizes are mixed and managed according to the present invention is made below.

When cells of service areas of different sizes are mixed, a macro cell, a Femto cell, a pico cell, a micro cell, and the like can be mixed and managed in a wireless communication system.

A wireless communication system in which a macro cell and a Femto cell are mixed and constructed as illustrated in FIGS. 1A and 1B below is described, for example. However, the present invention can be equally applicable to wireless communication systems in which cells of a different kind are mixed. Here, the macro cell denotes a cell administered by a macro BS, and the Femto cell denotes a cell administered by a Femto BS.

If the macro cell and the Femto cell are mixed, the Femto BS synchronizes with the neighbor macro BS. At this time, the Femto BS and the macro BS can provide service through the same frequency band, different adjacent frequency bands, or different non-adjacent frequency bands depending on the scenario of frequency management.

FIGS. 1A and 1B illustrate diagrams of a construction of a wireless communication system in which cells of service areas of different sizes are mixed and managed according to an exemplary embodiment of the present invention.

Referring to FIG. 1A, the wireless communication system includes a macro BS 100 and Femto BSs 110, 120, and 130. Here, the macro BS 100 and the Femto BS1 110 provide service using a frequency band (f1). The Femto BS2 120 provides service using a frequency band (f2). The Femto BS3 130 provides service using a frequency band (f3).

The Femto BSs 110, 120, and 130 can be located within a cell of the macro BS 100 or can be adjacently located outside the cell of the macro BS 100. Accordingly, a MS 140 receiving service from the macro BS 100 can handover to the Femto BSs 110, 120, and 130.

The Femto BSs 110, 120, and 130 periodically transmit IWSs using the frequency band (f1) such that the MS 140 can select a time for handover and a target BS for handover. At this time, the Femto BSs 110, 120, and 130 periodically transmit the IWSs using a time/frequency resource predefined with the macro BS 100. For example, as illustrated in FIG. 1B, the Femto BSs 110, 120, and 130 transmit IWSs using a time/frequency resource allocated in common on an operation Frequency Allocation (FA) (i.e., frequency band) (f1) of the macro BS 100 so that the IWSs are overlaid with each other. For another example, the Femto BSs 110, 120, and 130 may transmit IWSs using the same time/frequency resource on the operation FA (f1) of the macro BS 100 so that the IWSs are overlaid with each other among Femto BSs using the same operation FA. Additionally, if the macro BS 100 and the Femto BSs 110, 120, and 130 operate in the same FA, the Femto BSs 110, 120, and 130 can transmit IWSs through the operation FA (f1) of the macro BS 100.

The Femto BSs 110, 120, and 130 encode the IWSs at a protection level of a Broadcast Channel (BCH) to transmit the IWSs.

Also, if the IWSs of the Femto BSs 110, 120, and 130 are overlaid with each other, the Femto BSs 110, 120, and 130 can apply different scrambling or a different subcarrier mapping sequence to each Femto BS so that the MS 140 receiving the IWSs can distinguish the overlaid IWSs.

The MS 140 receiving service from the macro BS 100 can receive the IWSs from the Femto BSs 110, 120, and 130 through the operation FA (f1) of the macro BS 100. In this case, the MS 140 can recognize that it is to perform handover to the Femto BS transmitting the IWS and perform handover to the Femto BS.

As described above, if the Femto BS transmits an IWS through an IWS interval, the macro BS, the Femto BS, and the MS have to have knowledge of IWS configuration information. Here, the IWS configuration information includes the IWS interval, an IWS transmission period, a length of an IWS transmission interval, and so forth.

The IWS configuration information can be fixedly defined in a system standard, but may be changed depending on a wireless environment. For example, the IWS configuration information can be changed depending on a real wireless environment or a service provider's preference. In this case, the macro BS can decide the IWS configuration information in consideration of the wireless environment or service provider's preference and transmit the IWS configuration information to the Femto BS and the MS. The macro BS can transmit the IWS configuration information to the MS using a control signal transmitted through a broadcast channel.

Also, an upper network element on a communication network may decide the whole or part of IWS configuration information considering a wireless environment or a service provider's preference and transmit the decided IWS configuration information to the macro BS, the Femto BS, and the MS.

Also, a management server managing cells of service areas of different sizes on a communication network may decide the whole or part of IWS configuration information considering a wireless environment or a service provider's preference and transmit the decided IWS configuration information to the macro BS, the Femto BS, and the MS.

Also, the Femto BS can decide IWS configuration information considering a wireless environment or a service provider's preference and transmit the decided IWS configuration information to the macro BS and the MS. The Femto BS can transmit the IWS configuration information to the MS using a control signal transmitted through a broadcast channel.

The following description is made on the assumption that the macro BS decides IWS configuration information. However, even the Femto BS, the management server, and the upper network element can decide the IWS configuration information in the same with the macro BS.

The macro BS can set an IWS interval in which the Femto BSs transmit IWSs as illustrated in FIG. 2 below.

FIG. 2 illustrates a frame structure including an IWS interval according to an exemplary embodiment of the present invention.

Referring to FIG. 2, a macro BS sets an IWS interval 200 by a specific symbol interval of a corresponding frame in a period of frames of 'N' number. For example, the macro BS sets the IWS interval 200 in forms illustrated in FIGS. 3A to 3C below.

Figure 3A:
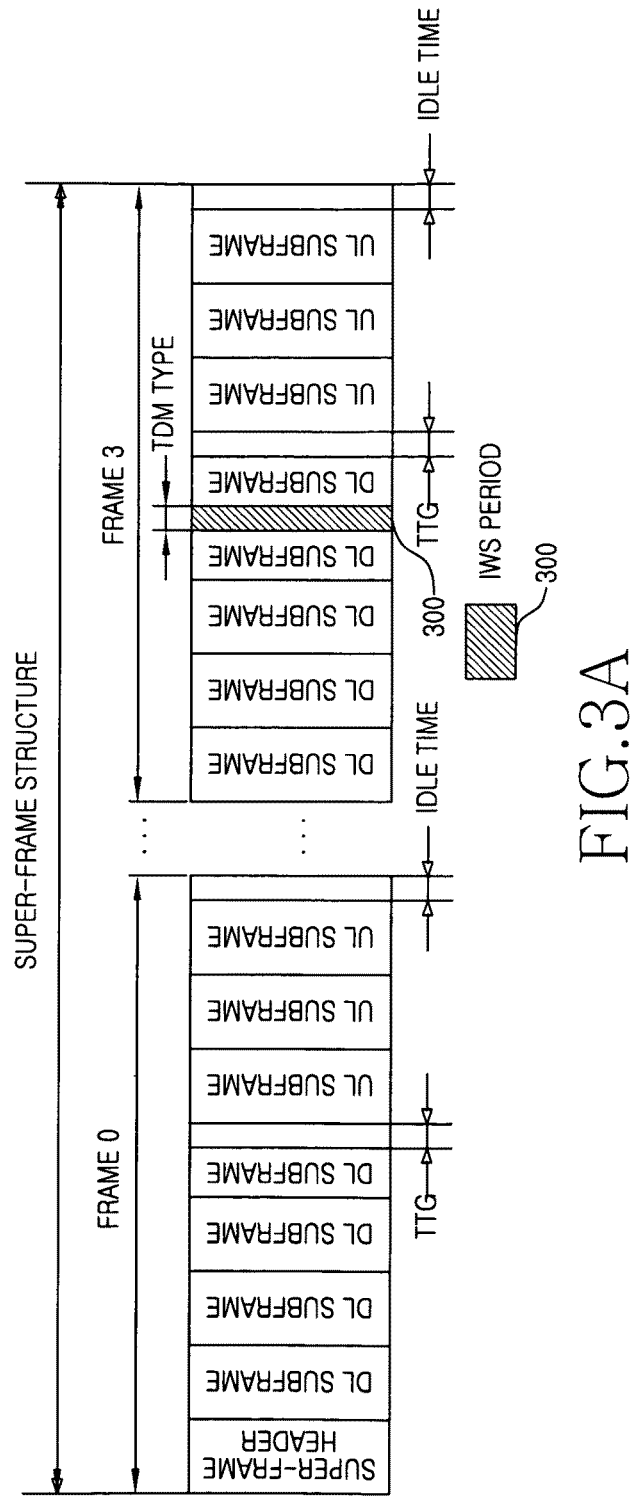
FIGS. 3A to 3C illustrate diagrams of a frame structure including an IWS interval according to an exemplary embodiment of the present invention.
Figure 3B:
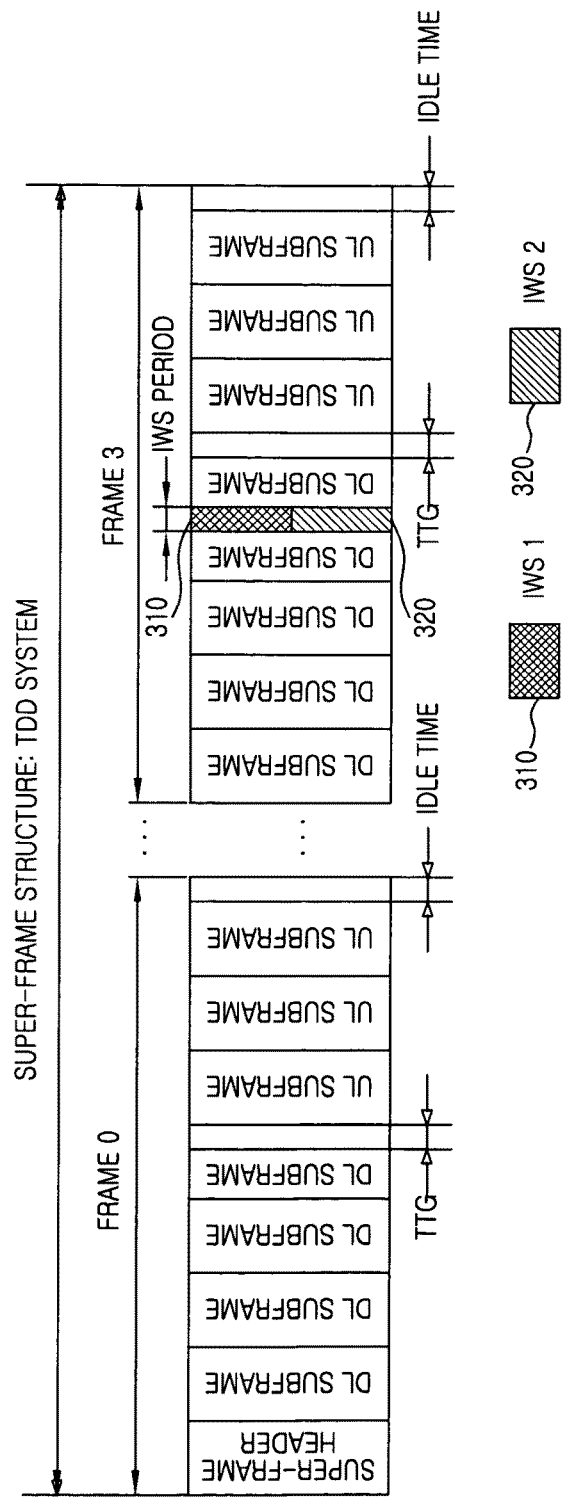
Figure 3C:
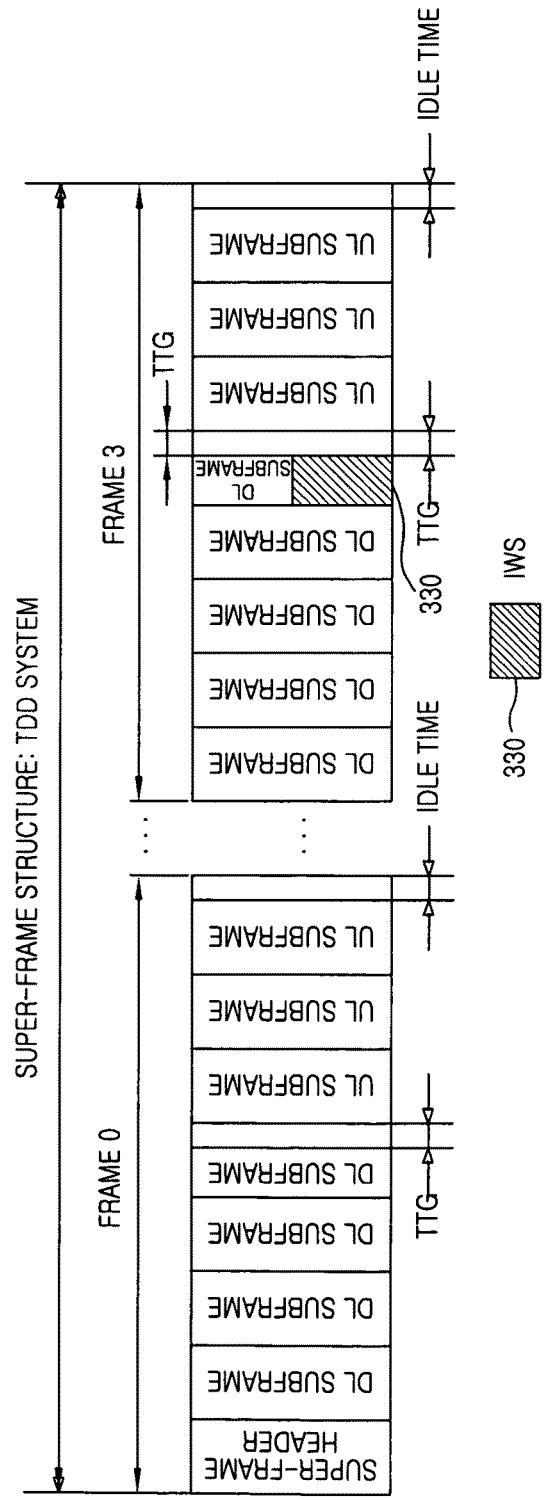

FIGS. 3A to 3C below describe that a partial resource of a downlink frame is allocated as the IWS interval 200 in a Time Division Duplex (TDD) wireless communication system, for example. This can be equally applicable to a downlink frame of a Frequency Division Duplex (FDD) or half duplex FDD wireless communication system. However, in the case of the half duplex FDD wireless communication system, a macro BS can set an IWS interval so that all MSs by group can receive an IWS.

FIGS. 3A to 3C illustrate diagrams of a frame structure including an IWS interval according to another exemplary embodiment of the present invention.

In FIG. 3, the assumption is that a macro BS constructs a frame in a form of a super-frame. One super-frame includes four frames, and each frame includes eight sub-frames.

As illustrated in FIG. 3A, the macro BS sets an IWS interval 300 by a partial resource of a frame 3 divided in a Time Division Multiple (TDM) scheme.

As illustrated in FIG. 3B, the macro BS sets IWS intervals 310 and 320 by partial resources of the frame 3 divided in the Time Division Multiple (TDM) scheme. The IWS intervals 310 and 320 are divided into a first IWS interval 310 and a second IWS interval 320 in accordance with a Frequency Division Multiple (FDM) scheme.

As illustrated in FIG. 3C, the macro BS sets an IWS interval 330 on the basis of a resource unit.

The following description is made on the assumption that nodes constituting a wireless communication system transmit/receive signals using a super-frame. At this time, the macro BS can set an IWS interval so that the Femto BSs transmit IWSs in each super-frame of a predetermined period. For example, the macro BS can set an IWS interval so that the Femto BSs transmit IWSs through super-frames that are different from each other by operation frequency.

Figure 4:
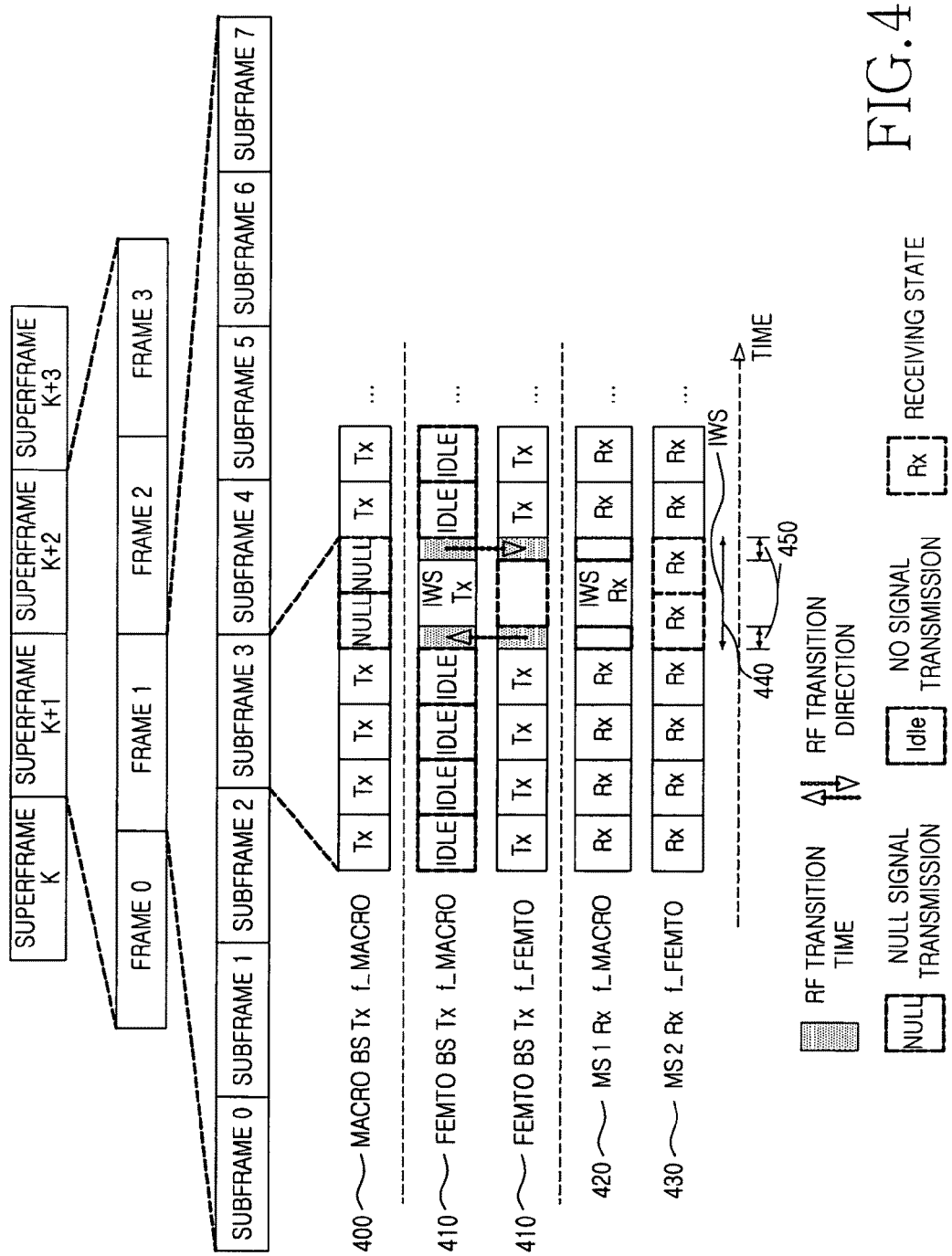
FIG. 4 illustrates a diagram of a frame structure for transmitting an IWS according to an exemplary embodiment of the present invention.

FIG. 4 illustrates a frame structure for transmitting an IWS according to an exemplary embodiment of the present invention.

As illustrated in FIG. 4, one super-frame includes four frames, and one frame includes eight sub-frames.

A macro BS 400 provides service using a frequency ($f_{Macro}$). A Femto BS 410 provides service using a frequency ($f_{Femto}$).

The macro BS 400 provides service to an MS1 420 using the frequency ($f_{Macro}$). However, during an IWS interval 440, the macro BS 400 does not transmit a signal using the frequency ($f_{Macro}$).

The Femto BS 410 provides service to an MS2 430 using the frequency ($f_{Femto}$). However, during the IWS interval 440, the Femto BS 410 transmits an IWS using the operation frequency ($f_{Macro}$) of the macro BS 400. For example, during a Radio Frequency (RF) transition interval 450, the Femto BS 410 changes an operation frequency into the operation frequency ($f_{Macro}$) of the macro BS 400 and transmits the IWS using the operation frequency ($f_{Macro}$). After transmitting the IWS, during the RF transition interval 450, the Femto BS 410 again changes the operation frequency into the operation frequency ($f_{Femto}$) and provides service to the MS2 430.

In order to transmit the IWS using the operation frequency ($f_{Macro}$) of the macro BS 400 during the IWS interval 440, the Femto BS 410 does not provide service using its own operation frequency ($f_{Femto}$). Thus, the Femto BS 410 does not allocate the MS2 430 a resource corresponding to the IWS interval 440. However, if allocating, the Femto BS 410 allocates a different resource to the MS2 430.

The Femto BS 410 sets a power of the IWS and a Modulation and Coding Scheme (MCS) level so that macro MSs can stably receive the IWS transmitted by the Femto BS itself. At this time, the Femto BS 410 can set the power of the IWS and the MCS level using a transmit power of a control signal and an MCS level. For example, the Femto BS 410 sets transmission coverage of an IWS identically with transmission coverage of a control signal such as a synchronization signal of the Femto BS 410, and the like, or identically with transmission coverage of a data signal of the Femto BS 410. The Femto BS 410 can control the transmission coverage of the IWS by changing the transmit power of the IWS or the MCS level. Here, the macro MS, which is an MS receiving service from the macro BS 400, includes the MS1 420.

In general, an MS decides handover or non-handover considering a signal strength that is measured using a control signal received from a BS. The Femto BS 410 sets transmission coverage of an IWS considering transmission coverage of a control signal so that an MS can receive the IWS and decide handover or non-handover.

The MS1 420 receives service from the macro BS 400 using the frequency ($f_{Macro}$). Also, during the IWS interval 440, the MS1 420 may receive an IWS from the Femto BS 410 depending on its own position.

When receiving an IWS with no error, the MS1 420 recognizes that the MS1 itself is located in a service area of the Femto BS 410 and requires handover. Also, the MS1 420 can acquire neighbor cell information from the IWS received from the Femto BS 410. In this case, the MS1 420 decides handover or non-handover through the IWS received from the Femto BS 410 or requests the macro BS 400 to perform scanning for handover.

When failing to receive the IWS during the IWS interval 440, the MS1 420 recognizes that the MS1 itself is located outside a service area of the Femto BS 410 and does not require handover.

The MS2 430 receives service from the Femto BS 410 using the frequency ($f_{Femto}$). However, during the IWS interval 440, the MS2 430 receives no signal from the Femto BS 410.

During the IWS interval 440, the MS2 430 maintains a connection with the Femto BS 410 because the Femto BS 410 resumes service using the frequency ($f_{Femto}$) after the IWS interval 440.

In the aforementioned exemplary embodiment of the present invention, the Femto BS 410 supports only one frequency band. Accordingly, the Femto BS 410 cannot transmit a signal using the frequency ($f_{Femto}$) while transmitting an IWS using the frequency ($f_{Macro}$).

In another exemplary embodiment of the present invention, a Femto BS 410 may transmit signals simultaneously using both a frequency ($f_{Femto}$) and a frequency ($f_{Macro}$). That is, the Femto BS 410 can transmit a signal using the frequency ($f_{Femto}$) while transmitting an IWS using the frequency ($f_{Macro}$). Thus, the MS2 430 can receive service from the Femto BS 410 even during the IWS interval 440.

In the aforementioned exemplary embodiment of the present invention, the Femto BS sets an MCS level of an IWS and a transmit power considering an MCS level of a control signal and a transmit power, and sets transmission coverage of the IWS identically with transmission coverage of the control signal.

In another exemplary embodiment of the present invention, a Femto BS may set transmission coverage of an IWS identically with transmission coverage of a control signal through simulation, actual measurement, a self-organization function of the Femto BS, and so forth.

If the Femto BS transmits an IWS to a macro MS as above, it is advantageous that the Femto BS transmits the IWS so that all macro MSs can receive the IWS. For example, in the case of constructing a super-frame, the Femto BS can transmit the IWS using part of a super-frame header resource, using a partial resource just before a start of a super-frame header, or using a partial resource soon after the super-frame header.

Figure 5:
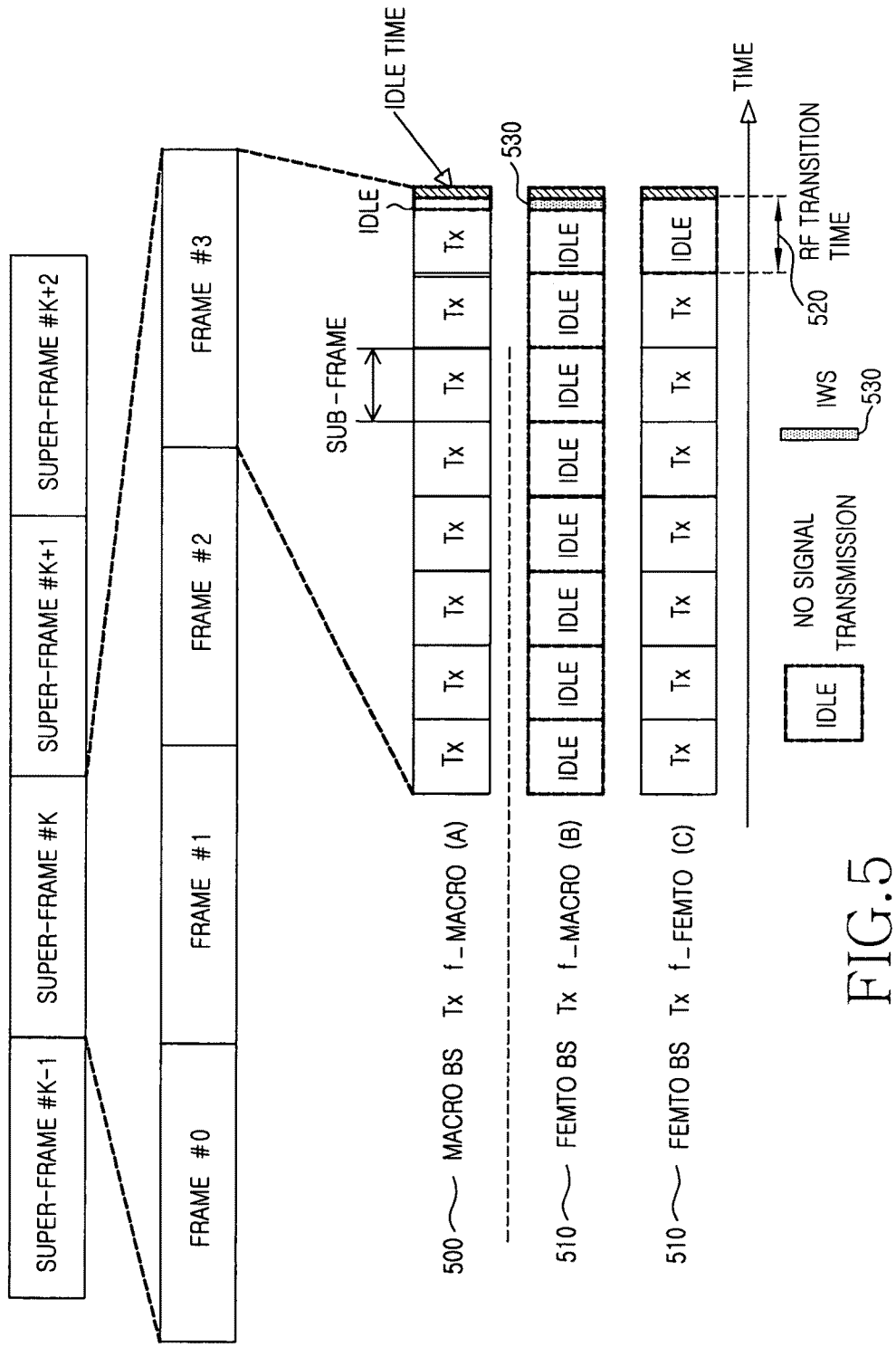
FIG. 5 illustrates a diagram of a frame structure for transmitting an IWS according to an exemplary embodiment of the present invention.

If a wireless communication system is of an FDD scheme, the Femto BS transmits an IWS as illustrated in FIG. 5 below.

FIG. 5 illustrates a frame structure for transmitting an IWS according to another exemplary embodiment of the present invention.

As illustrated in FIG. 5, if using an FDD scheme, a macro BS 500 and a Femto BS 510 divide a frequency resource and distinguish a downlink and an uplink. The following description is made on the assumption that the macro BS 500 sets an IWS interval 530 by a partial resource of a sub-frame 8 that constitutes a frame 3.

The macro BS 500 provides service to a macro MS using an operation frequency ($f_{Macro}$). However, during the IWS interval 530, the macro BS 500 transmits no signal using the frequency ($f_{Macro}$).

The Femto BS 510 provides service to a Femto MS using an operation frequency ($f_{Femto}$). However, during the IWS interval 530, the Femto BS 510 transmits an IWS using the operation frequency ($f_{Macro}$) of the macro BS 500. At this time, the Femto BS 510 uses, as a frequency transition interval, a redundant resource not allocated as the IWS interval 530 among a resource of the sub-frame 8. Thus, during the redundant resource, the Femto BS 510 transmits no signal. Here, the Femto MS represents an MS receiving service from the Femto BS 510.

Figure 6:
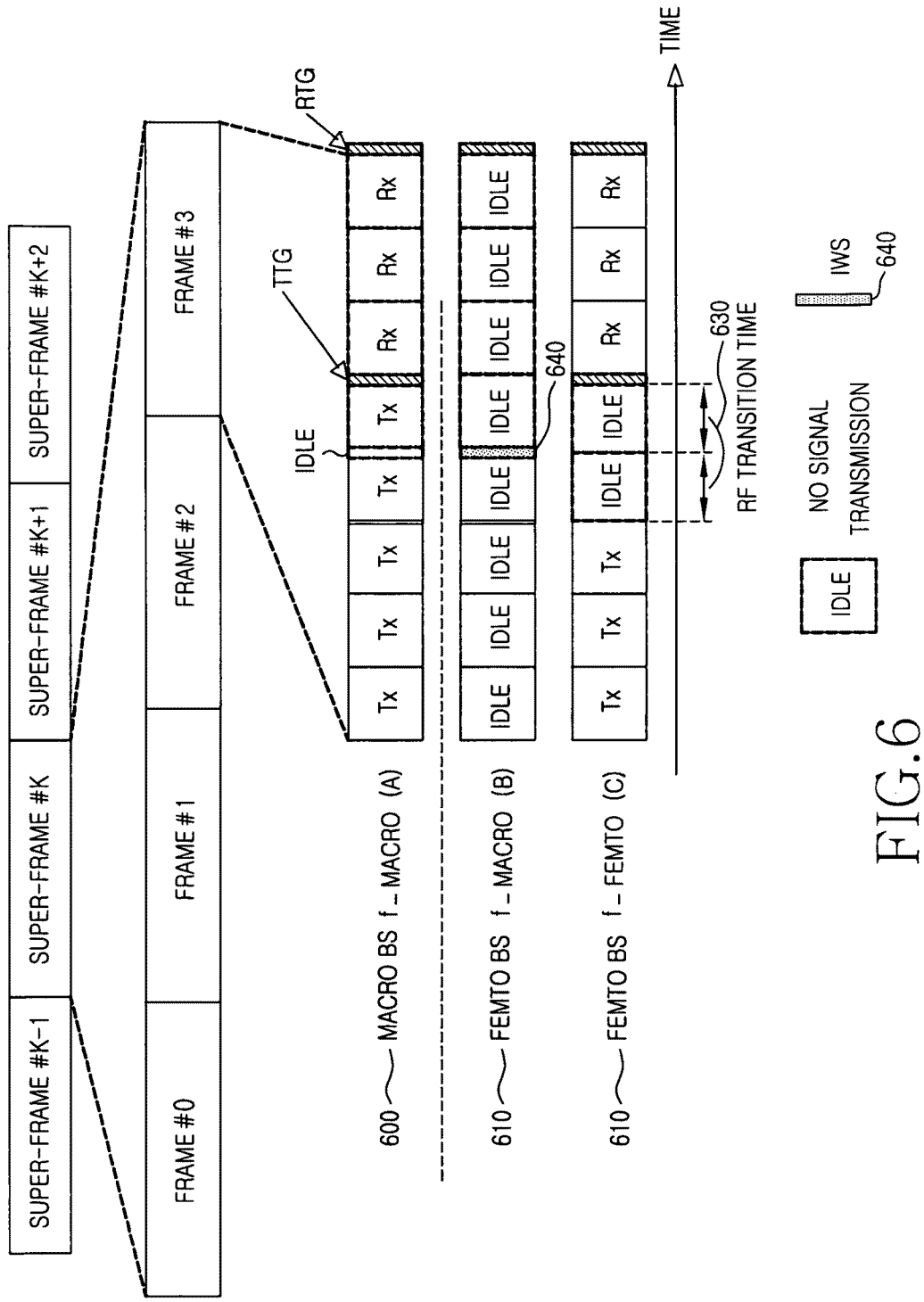
FIG. 6 illustrates a diagram of a frame structure for transmitting an IWS according to an exemplary embodiment of the present invention.

If a wireless communication system uses a TDD scheme, the Femto BS transmits an IWS as illustrated in FIG. 6 below.

FIG. 6 illustrates a frame structure for transmitting an IWS according to a further another exemplary embodiment of the present invention.

As illustrated in FIG. 6, if using a TDD scheme, a macro BS 600 and a Femto BS 610 divide a time resource and distinguish a downlink and an uplink. The following description is made on the assumption that the macro BS 600 sets an IWS interval 640 by a partial resource of a downlink frame positioned just before a start of a super-frame header. For example, the macro BS 600 sets the IWS interval 640 by a partial resource of a downlink frame in a frame 3 of a $k^{th}$ super-frame.

The last sub-frame of the downlink frame includes a mode transition interval, thus making it difficult to consistently maintain a position of the IWS interval 640. Thus, the macro BS 600 sets the IWS interval 640 by a partial resource of a sub-frame that is one earlier than the last sub-frame of the downlink frame. For example, in an Institute of Electrical and Electronics Engineers (IEEE) 802.16m standard, the last sub-frame of a downlink frame is designed to have the last OFDM symbol interval equal to a null to ensure a mode transition time. Thus, the macro BS 600 sets the IWS interval 640 by a resource of the last OFDM symbol interval of a sub-frame earlier one than the last sub-frame of the downlink frame.

The macro BS 600 provides service to a macro MS using an operation frequency ($f_{Macro}$) but, during the IWS interval 640, transmits no signal.

The Femto BS 610 provides service to a Femto MS using an operation frequency ($f_{Femto}$). However, during the IWS interval 640, the Femto BS 610 transmits an IWS using the operation frequency ($f_{Macro}$) of the macro BS 600. At this time, the Femto BS 610 uses, as a frequency transition interval, a redundant resource not allocated as the IWS interval 640 and the last sub-frame among a resource of a sub-frame including the IWS interval 640. Thus, the Femto BS 610 transmits no signal during the redundant resource and the last sub-frame.

As described above, the macro BS 600 sets an IWS interval 640 by a partial resource of a downlink frame positioned just before a start of a super-frame header. If a sub-frame constituting the downlink frame is comprised of six OFDM symbols, the macro BS 600 sets an IWS interval as illustrated in FIG. 7 below.

Figure 7:
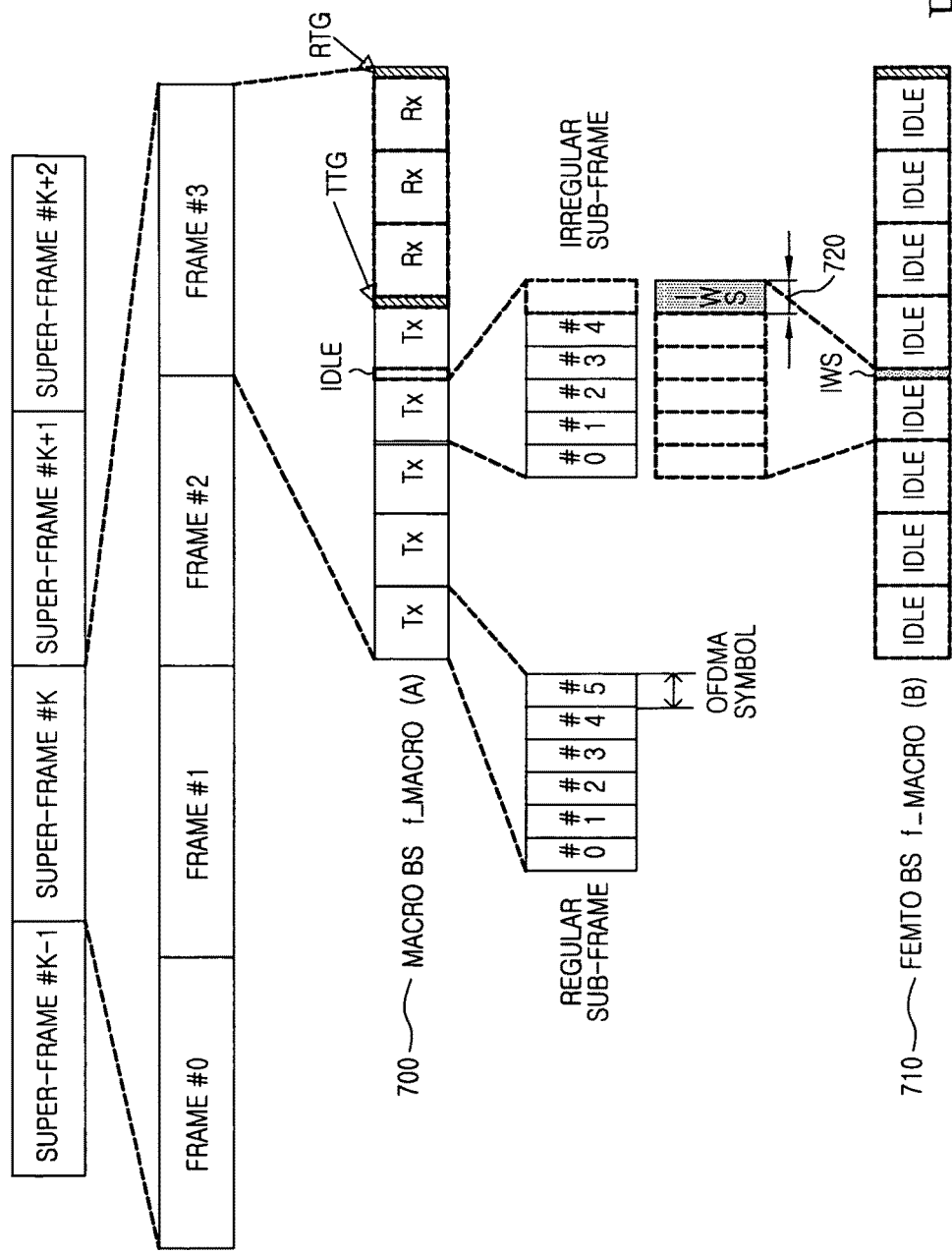
FIG. 7 illustrates a diagram of a frame structure for transmitting an IWS according to an exemplary embodiment of the present invention.

FIG. 7 illustrates a frame structure for transmitting an IWS according to a yet another exemplary embodiment of the present invention.

Referring to FIG. 7, the macro BS 700 sets an IWS interval 720 by a partial resource of a downlink frame positioned just before a start of a super-frame header.

Also, the macro BS 700 sets the IWS interval 720 by a partial resource of a sub-frame that is one earlier than the last sub-frame of the downlink frame to set the consistent IWS interval 720. For example, in the case of using five sub-frames among eight sub-frames constituting a frame for the sake of downlink, the macro BS 700 sets the IWS interval 720 by a partial resource of a $4^{th}$ sub-frame of a frame 3. At this time, the macro BS 700 sets the IWS interval 720 by the last OFDM symbol of the $4^{th}$ sub-frame.

In the aforementioned exemplary embodiment of the present invention, the macro BS sets an IWS interval using a partial resource of a downlink frame.

In another exemplary embodiment of the present invention, a macro BS may set an IWS interval so that an IWS is transmitted using an idle time positioned in a downlink frame in order to reduce the influence of IWS interference on a macro cell. Here, the idle time represents an unused time resource remaining after construction of sub-frames within a frame.

As described above, the macro BS sets an IWS interval so that the Femto BSs can transmit IWSs. At this time, the macro BS can construct the IWS interval as illustrated in FIG. 8 below so that neighbor Femto BSs can reduce interference of IWSs among themselves or each Femto BS using the same frequency can distinguish and transmit IWSs.

Figure 8A:
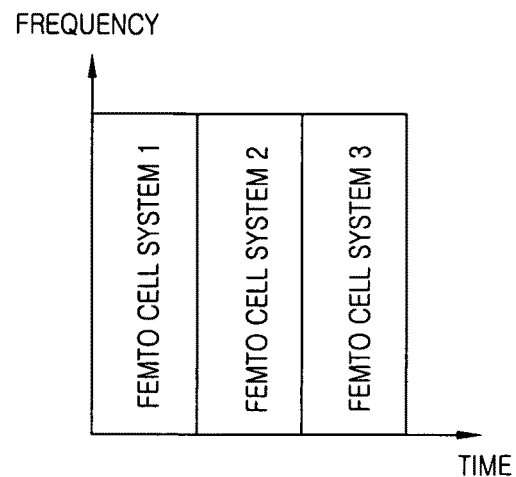
FIGS. 8A and 8B illustrate diagrams of a resource allocation structure of an IWS interval according to an exemplary embodiment of the present invention.
Figure 8B:
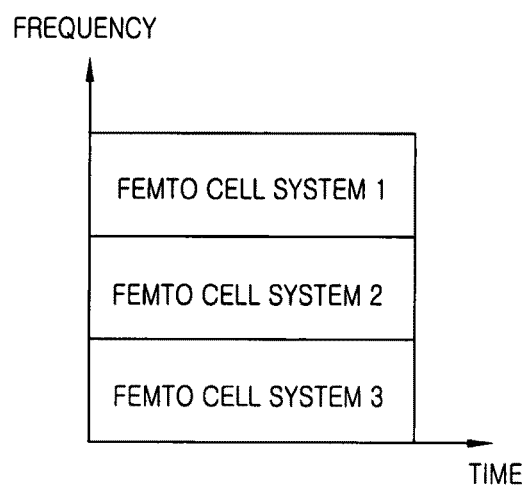

FIGS. 8A and 8B illustrate a resource allocation structure of an IWS interval according to an exemplary embodiment of the present invention.

FIG. 8A illustrates an IWS interval constructed using a TDD scheme. FIG. 8B illustrates an IWS interval constructed using an FDD scheme.

Referring to FIG. 8A, a macro BS divides the IWS interval using a time resource.

Referring to FIG. 8B, the macro BS divides the IWS interval using a frequency resource.

The macro BS may apply a Code Division Multiple (CDM) scheme to the IWS interval that is constructed using the time resource or the frequency resource as in FIG. 8A or 8B.

The macro BS may construct the IWS interval using a code.

As described above, when the Femto BS transmits an IWS, the Femto BS can configure the IWS as in FIG. 9 below such that macro MSs can estimate channels through the IWS. That is, a signal transmitted by the macro BS and a signal transmitted by the Femto BS are transmitted to the macro MSs suffering different radio environments. Thus, as illustrated in FIG. 9 below, the Femto BS includes a pilot or preamble in the IWS and transmit the IWS so that an MS can estimate a channel through the IWS.

Figure 9A:
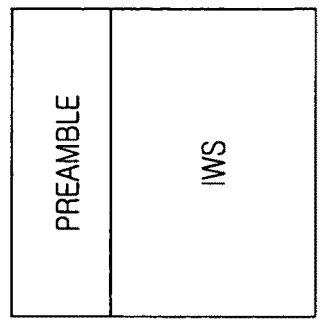
FIGS. 9A and 9B illustrate diagrams of a structure of an IWS according to an exemplary embodiment of the present invention.
Figure 9B:
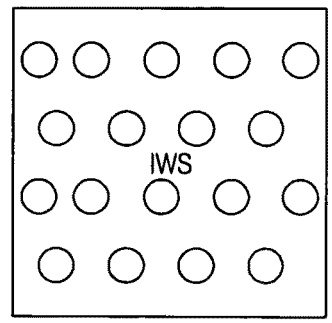

FIGS. 9A and 9B illustrate a structure of an IWS according to an exemplary embodiment of the present invention.

FIG. 9A illustrates an IWS including a preamble. FIG. 9B illustrates an IWS including a pilot.

A Femto BS transmits an IWS that is configured to include a preamble for channel estimation of MSs as illustrated in FIG. 9A.

The Femto BS transmits an IWS that is configured to include a pilot for channel estimation of MSs as illustrated in FIG. 9B.

The Femto BS configures the IWS including information illustrated in FIG. 10 below to provide information to macro MSs for the sake of handover.

Figures 10A, 10B:
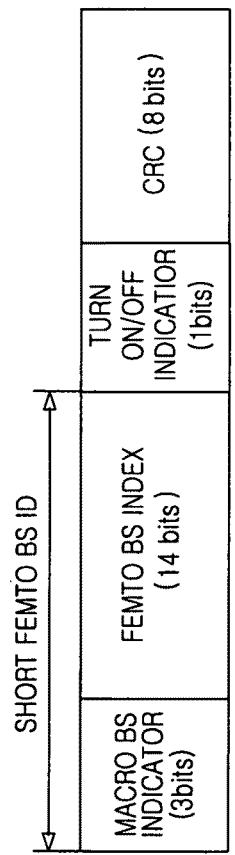
FIGS. 10A and 10B illustrates diagrams of a message construction of an IWS according to an exemplary embodiment of the present invention.

FIGS. 10A and 10B illustrate a message construction of an IWS according to an exemplary embodiment of the present invention.

Referring to FIG. 10A, the IWS includes a BS Identifier (BS ID) of a Femto BS transmitting the IWS, a center frequency or frequency channel number (i.e., channel number) of the Femto BS, a preamble sequence index (i.e., a preamble index) of the Femto BS, a signal bandwidth (i.e., a bandwidth size) of the Femto BS, a service level (i.e., a service level prediction) that can be provided by the Femto BS, a power saving mode on/off (i.e., a turn on/off indicator) of the Femto BS, and active mode transition information (i.e., wake-up information) of a Femto BS operating in a power saving mode.

An IWS can be configured using only part of information illustrated in FIG. 10A. That is, the IWS can include only the minimum information to reduce a size of an IWS interval. In this case, upon receiving the IWS, an MS can request a network node including a macro BS and a Femto BS for remaining information necessary for handover and excluded from the IWS, and acquire the remaining information.

An IWS may include additional information other than the information illustrated in FIG. 10A. For example, the IWS may further include a Closed Subscriber Group (CSG) identifier in the information illustrated in FIG. 10A. At this time, the IWS may include all of the BS ID of the Femto BS and the CSG identifier or include only the CSG identifier as identifier information included in the IWS.

Referring to FIG. 10B, the IWS can include an identifier of a Femto BS transmitting the IWS, a power saving mode on/off (i.e., a turn on/off indicator) of the Femto BS, and a Cyclic Redundancy Check (CRC) code for checking the occurrence or non-occurrence of an error of the IWS. Here, the identifier of the Femto BS represents a BS ID of the Femto BS or a short Femto BS ID.

The short Femto BS ID represents an inherent identifier for identifying the Femto BS on a network. The short Femto BS ID includes a macro BS indicator that is information on a macro BS in whose cell the Femto BS is located, and a Femto BS index.

Table 1 below represents a mapping table for finding the inherent identifier of the Femto BS with reference to the Femto BS index. For example, in Table 1 below, a macro BS can find an inherent identifier of a Femto BS using macro BS information of neighbor macro BSs and mapping tables of the neighbor macro BSs.

Table 1 below shows allocation between a macro BS of macro BS information of 'XXX[3 bits]' and a Femto BS index of '000[48 bits]'.

TABLE 1

Allocation between macro BS of macro BS information of 'XXX[3 bits]' and Femto BS index of '000[48 bits]'

| Femto BS index | Network inherent identifier |
|---|---|
| ΔΔΔ [14 bits] | Network inherent identifier of Femto BS |
| ... | ... |

When a Femto BS transmits an IWS, the Femto BS sets a protection level of the IWS identically with a broadcast channel so that all MSs located in a service area of the Femto BS itself or movable inside the service area can receive the IWS. For example, when the Femto BS configures and transmits an IWS as illustrated in FIG. 10B, the Femto BS can configure the IWS at the same protection level as that of the broadcast channel as illustrated in FIG. 11 below.

Figure 11:
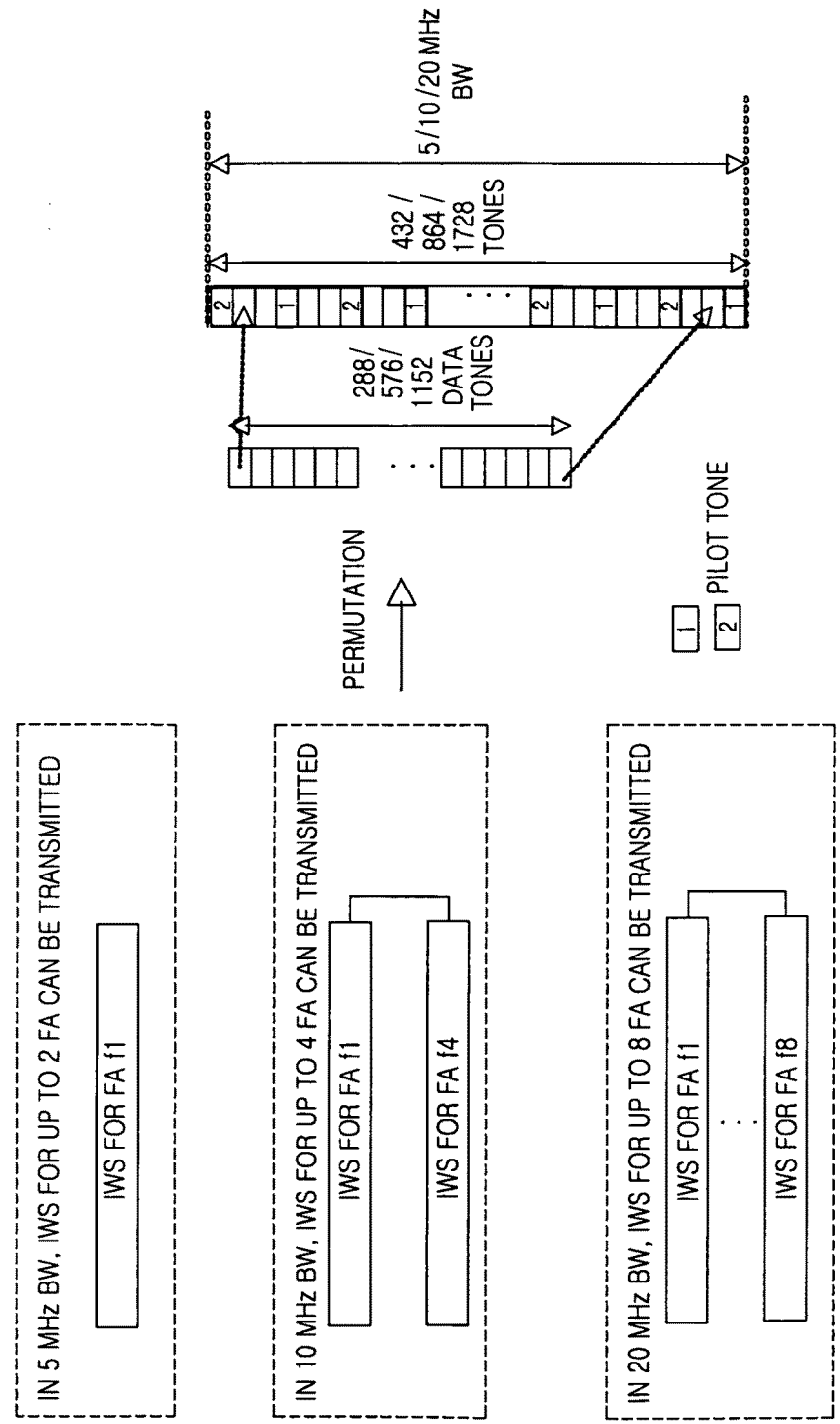
FIG. 11 illustrates a diagram of a structure of an IWS transmission symbol according to an exemplary embodiment of the present invention.

FIG. 11 illustrates a structure of an IWS transmission symbol according to an exemplary embodiment of the present invention.

Referring to FIG. 11, an IWS is configured to have an IWS protection level of a modulation scheme of Quadrature Phase Shift Keying (QPSK), a coding rate of a ⅓ Convolutional Code (CC), and the number of times of iteration of '6' to keep the same transmission coverage as a broadcast channel. For example, when the IWS needs twenty-six (26) bits for including the information illustrated in FIG. 10B, a Femto BS needs two-hundred thirty-four (234) bits for transmitting the IWS according to the IWS protection level.

Assuming that the maximum forty-eight (48) bits are transmissible through one symbol and a ratio of pilot tone to data tone is equal to 1:2, the Femto BS can transmit a data tone of the maximum two-hundred eighty-eight (288) bits in five (5) MHz band. Thus, in five (5) MHz band, the Femto BS can transmit one IWS including the information illustrated in FIG. 10B during one IWS interval.

Under the above assumption, the Femto BS can transmit a data tone of the maximum five-hundred seventy-six (576) bits in ten (10) MHz band. Thus, in ten (10) MHz band, the Femto BS can transmit two IWSs including the information illustrated in FIG. 10B during one IWS interval.

Under the above assumption, the Femto BS can transmit a data tone of the maximum eleven hundred fifty-two (1152) bits in twenty (20) MHz band. Thus, in twenty (20) MHz band, the Femto BS can transmit four IWSs including the information illustrated in FIG. 10B during one IWS interval.

As described above, when the Femto BS transmits an IWS during a predefined IWS interval within a macro cell, the Femto BS and a macro BS have to synchronize with each other. For example, the Femto BS and the macro BS synchronize with each other using a Global Positioning System (GPS). For another example, the Femto BS and the macro BS may synchronize with each other using a signal received from the macro BS. Additionally, the Femto BS and the macro BS may synchronize with each other with the help of an MS.

If the macro BS and the Femto BS synchronize with each other, a macro MS can distinguish an IWS and a signal of a macro cell in a time domain. However, in an actual wireless communication environment, an inter-signal reception synchronization error occurs and thus, interference occurs between the IWS and the signal of the macro cell. For example, a macro cell and a Femto cell are different in radius and thus, a delay time of a transmit signal is different. That is, if the macro MS is located around the Femto cell, a signal delay between the macro MS and the macro BS can be greater than a signal delay between the macro MS and the Femto BS. In this case, due to a difference of the signal delay time, interference can take place between the signal received by the macro MS from the macro BS and the IWS. In an additional example, if a repeater is installed within the macro cell, a signal transmitted through the repeater can cause a synchronization error between the macro BS and the Femto BS. For further another example, an error may occur in a process in which an MS synchronizes an IWS.

Figure 23:
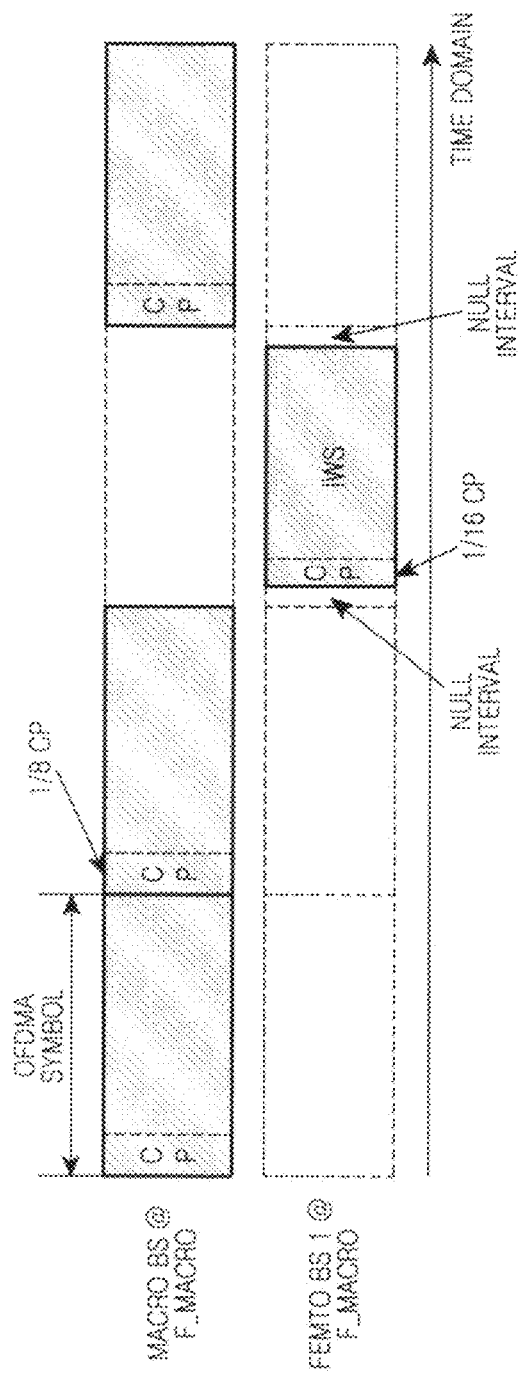
FIG. 23 illustrates a diagram of an IWS transmission construction for avoiding interference in a wireless communication system according to an exemplary embodiment of the present invention.

To reduce interference with a signal of the macro BS, the Femto BS can generate and transmit an IWS as illustrated in FIG. 23 below.

FIG. 23 illustrates an IWS transmission construction for avoiding interference in a wireless communication system according to an exemplary embodiment of the present invention.

Referring to FIG. 23, a Femto BS can construct a Cyclic Prefix (CP) of an IWS by ¹⁄₁₆ of an OFDM symbol length.

For example, it is general that a CP length is set as ⅛ of the OFDM symbol length. However, the Femto BS sets the CP length of the IWS by ¹⁄₁₆ of the OFDM symbol length. At this time, the Femto BS can arrange null intervals before and after the IWS using a time resource remaining after allocation to the IWS in an IWS interval. Thus, the Femto BS can avoid interference between a signal of a macro BS and the IWS resulting from a reception synchronization error, using the null intervals arranged before and after the IWS.

Figure 24:
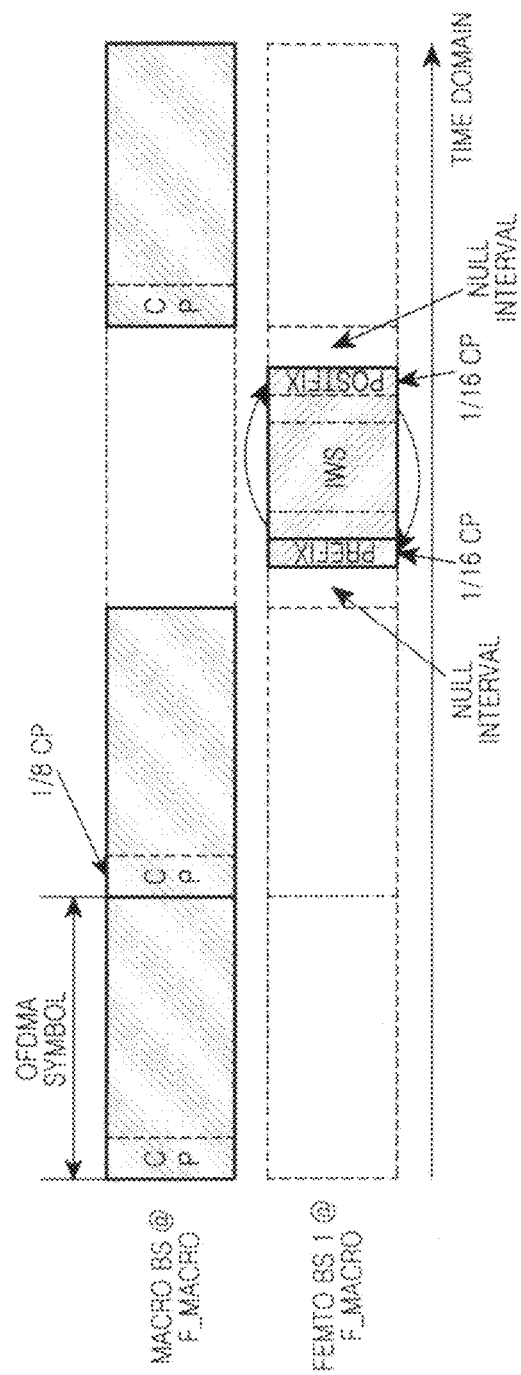
FIG. 24 illustrates a diagram of an IWS transmission construction for avoiding interference in a wireless communication system according to an exemplary embodiment of the present invention.

To reduce interference with a signal of a macro BS, the Femto BS can reduce a total length of an IWS as illustrated in FIG. 24 below.

FIG. 24 illustrates an IWS transmission construction for avoiding interference in a wireless communication system according to another exemplary embodiment of the present invention.

Referring to FIG. 24, a Femto BS can reduce a total length of an IWS and arrange null intervals before and after the IWS using a time resource remaining after allocation to the IWS in an IWS interval. At this time, the Femto BS adds a prefix corresponding to a rear portion of ⅛ of the original signal, to a front portion of the IWS. The Femto BS adds a postfix corresponding to a front portion of ⅛ of the original signal, to a rear portion of the IWS.

The Femto BS can avoid interference between a signal of a macro BS and the IWS resulting from a reception synchronization error, using the null intervals arranged before and after the IWS.

Figure 25:
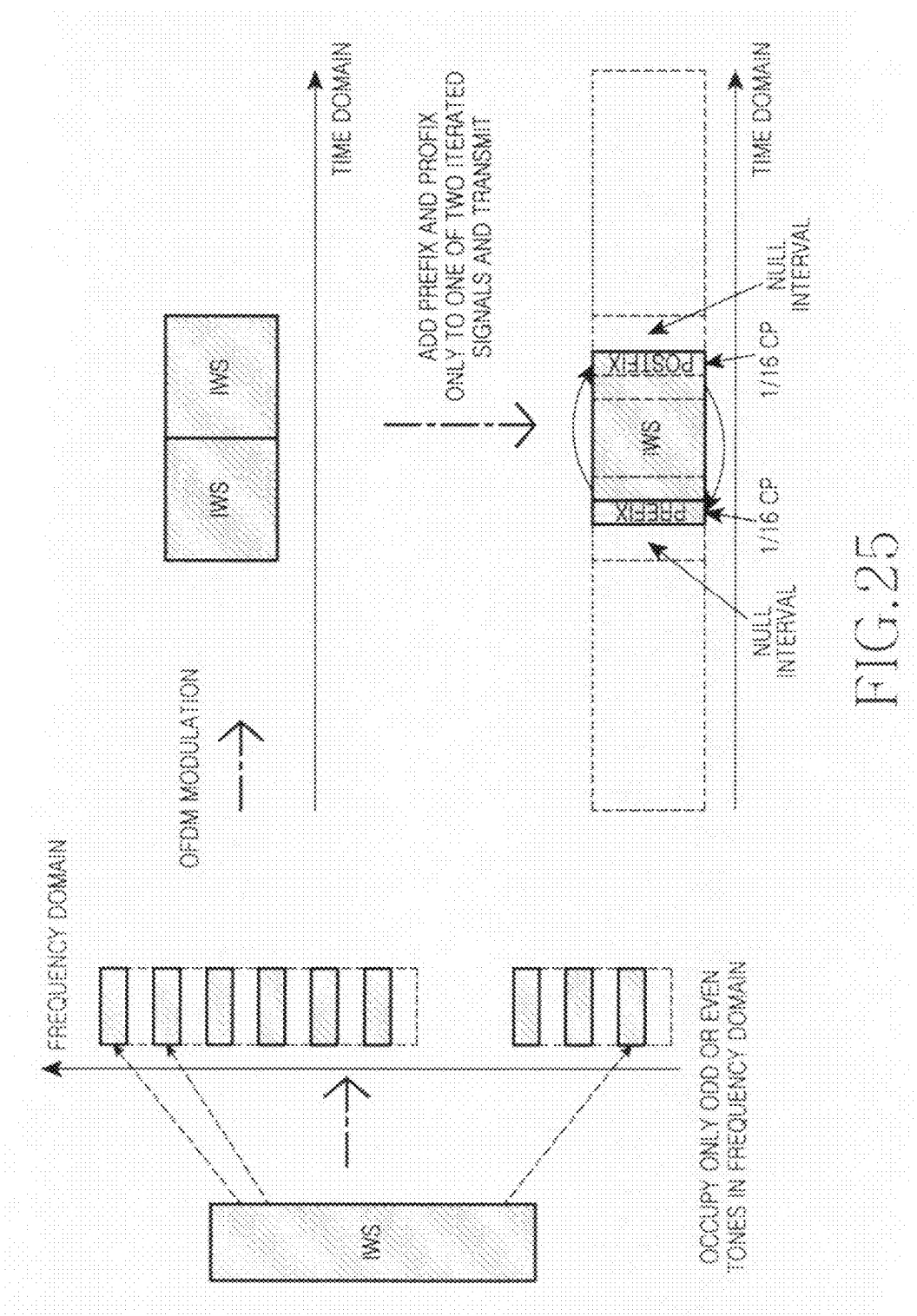
FIG. 25 illustrates a diagram of a construction of an IWS for reducing a total length of the IWS according to an exemplary embodiment of the present invention.

FIG. 25 illustrates a construction of an IWS for reducing a total length of the IWS according to an exemplary embodiment of the present invention.

As illustrated in FIG. 25, information symbols of an IWS are allocated to only to odd or even tones (i.e., subcarriers) in a frequency band, and an Orthogonal Frequency Division Multiplexing (OFDM) modulation (i.e., an Inverse Fast Fourier Transform (IFFT) operation) is performed. By doing so, a form in which the same signal is twice iterated in a time domain is represented.

A Femto BS selects one of the twice iterated signals, adds a prefix and a postfix to the selected signal, and generates an IWS. At this time, the Femto BS can arrange null intervals before and after the IWS using a time resource remaining after allocation to the IWS in an IWS interval.

The Femto BS can avoid interference between a signal of a macro BS and the IWS resulting from a reception synchronization error, using the null intervals arranged before and after the IWS.

If the macro BS provides service to an MS using a multi carrier, the Femto BSs can transmit IWSs to all carriers used by the macro BS so that all macro MSs can receive the IWSs. For example, the Femto BSs can transmit simultaneously the IWSs to all the carriers used by the macro BS during an IWS interval.

For another example, the Femto BSs can transmit sequentially the IWSs to the carriers used by the macro BS during the IWS interval. At this time, the Femto BSs may transmit the IWSs to one or more carriers at a time.

For further another example, the Femto BSs transmit the IWSs only to a center frequency or broadcast band among the carriers used by the macro BS during the IWS interval. If the center frequency or broadcast band exists in plural, the Femto BSs can simultaneously or sequentially transmit the IWSs to all the center frequencies or broadcast bands.

In yet another example, during the IWS interval, the Femto BSs can select carriers most used by macro MSs among the carriers used by the macro BS and transmit IWSs. At this time, the carriers most used by the macro MSs can be decided in the macro BS, a BS controller, or an upper network element on the basis of an MS receive rate. Also, information on the carriers most used by the macro MSs is informed the Femto BSs only if the carriers are changed. Here, the Femto BSs can simultaneously or sequentially transmit the IWSs to the selected carriers.

The following description is for a method in which the macro MS performs handover to the Femto BS using an IWS of the Femto BS. The following description is made on the assumption that the Femto BS configures and transmits an IWS including the information illustrated in FIG. 10B. Also, it is assumed that an operation frequency of the macro BS is equal to 'FA1', and an operation frequency of the Femto BS is equal to 'FA2'.

Figure 12:
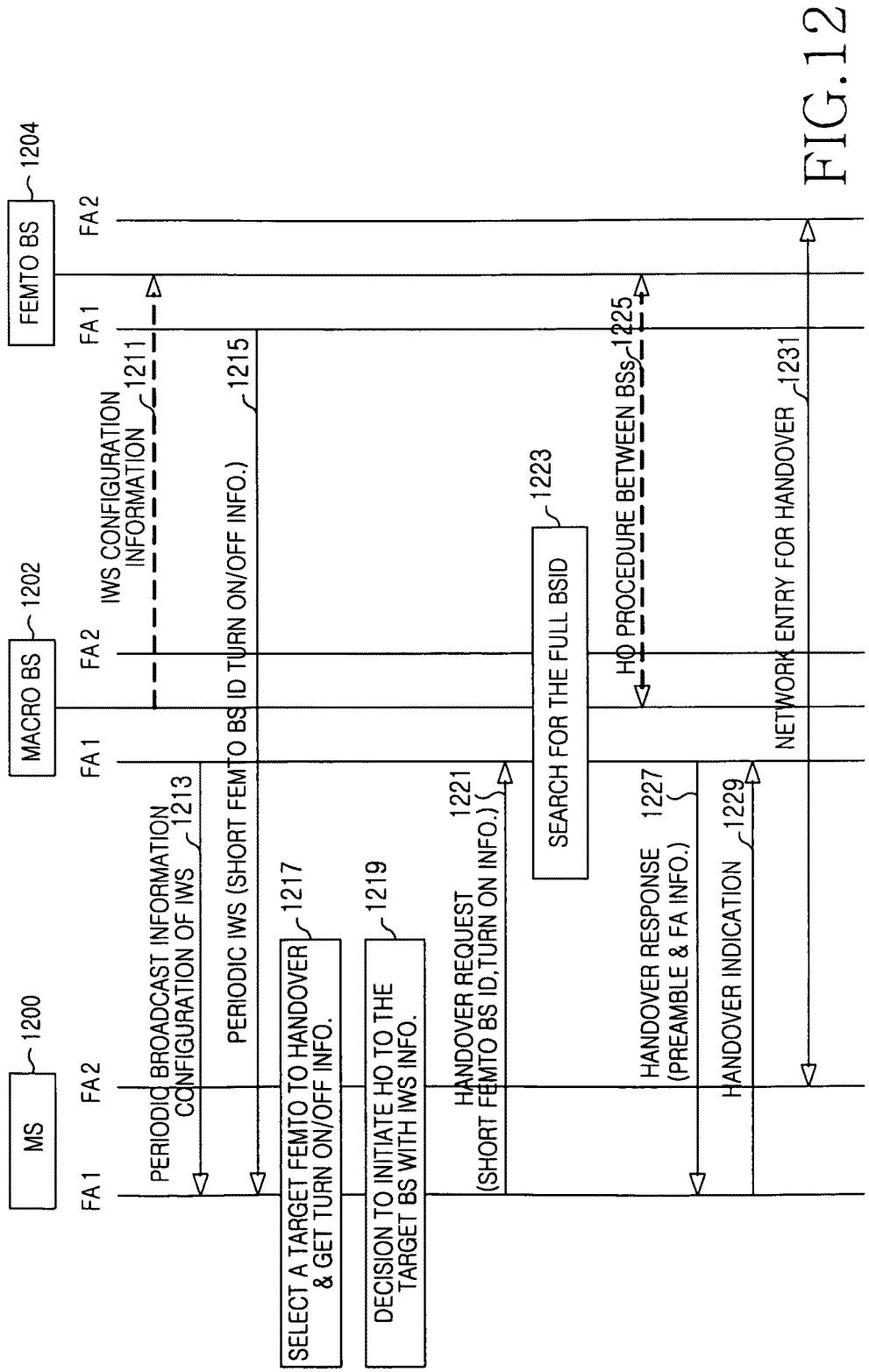
FIG. 12 illustrates a ladder diagram for a handover procedure using an IWS according to an exemplary embodiment of the present invention.

FIG. 12 illustrates a HO procedure using an IWS according to an exemplary embodiment of the present invention.

Referring to FIG. 12, in steps 1211 and 1213, a macro BS 1202 transmits IWS configuration information to an MS 1200 receiving service from the macro BS itself and a Femto BS 1204. For example, the macro BS 1202 transmits the IWS configuration information to the Femto BS 1204 through a wireless link or backbone network. Also, the macro BS 1202 transmits the IWS configuration information to the MS 1200 through a periodically transmitted broadcasting signal. Here, the IWS configuration information includes information such as a super-frame index to transmit an IWS, a position of an IWS transmission resource within a super-frame, and the like. The super-frame index to transmit the IWS includes a start slot of an IWS interval and a transmission period. The position of the IWS transmission resource includes a position of a frame to transmit the IWS within a super-frame, a position of a sub-frame to transmit the IWS within the frame, and position information on an OFDM symbol to transmit the IWS within the sub-frame.

The Femto BS 1204 identifies the IWS interval through the IWS configuration information received from the macro BS 1202.

If the IWS interval arrives, in step 1215, the Femto BS 1204 transmits an IWS to the MS 1200 through an operation frequency (FA1) of the macro BS 1202. At this time, the Femto BS 1204 decides a transmit power of the IWS and an MCS level so that MSs positioned in a service area of the Femto BS itself can stably receive the IWS. Here, the IWS includes identifier information of the Femto BS 1204 and power saving mode information of the Femto BS 1204. The identifier information includes at least one of a BS ID of the Femto BS 1204, a short Femto BS ID of the Femto BS 1204, and a CSG identifier.

The MS 1200 determines if the IWS transmitted by the Femto BS 1204 is received during the IWS interval. When failing to receive the IWS during the IWS interval, the MS 1200 recognizes that it does not have to handover to the Femto BS 1204. That is, the MS 1200 maintains a connection with the macro BS 1202.

Conversely, if receiving the IWS with no error, in step 1217, the MS 1200 acquires information for handover to the Femto BS 1204. For example, when receiving the IWS, the MS 1200 recognizes that the MS itself is located in a service area of the Femto BS 1204 and requires handover. The MS 1200 acquires the identifier information of the Femto BS 1204 and power saving mode information of the Femto BS 1204 from the IWS. Here, the power saving mode information represents information on whether the Femto BS 1204 operates in a power saving mode.

If the MS 1200 receives IWSs from a plurality of Femto BSs, the MS 1200 may estimate a channel for each of the Femto BSs through the IWS and decide a target Femto BS for handover.

When deciding to handover to a Femto BS through an IWS, the MS 1200 can selectively consider several items as follows.

First, the MS 1200 can consider conditions in which the MS 1200 should not handover to the Femto BS. For example, if a movement speed of the MS 1200 is high, the MS 1200 may increase an overhead due to a frequent handover. Thus, although receiving the IWS, the MS 1200 can selectively perform handover considering its own movement speed. That is, although receiving the IWS, the MS 1200 maintains a communication with the macro BS 1202 if its own movement speed is greater than a reference speed.

Second, the MS 1200 can consider information on MSs whose accesses are permitted by the Femto BS. That is, the Femto BS can either permit the access of all the MSs or can limit an accessible MS. Thus, the MS 1200 can selectively perform handover in consideration of access permission MS information of the Femto BS that transmits an IWS. That is, if the Femto BS transmitting the IWS limits the access of the MS 1200, the MS 1200 maintains a communication with the macro BS 1202.

If the MS 1200 decides to handover to the Femto BS 1204 in step 1219, the MS 1200 transmits a handover request signal, which includes the identifier information of the Femto BS 1204, to the macro BS 1202 in step 1221. Here, the handover request signal includes the power saving mode information of the Femto BS 1204.

In step 1223, through the handover request signal received from the MS 1200, the macro BS 1202 identifies information on the Femto BS 1204 for handover of the MS 1200. Here, the information on the Femto BS 1204 includes the identifier information and power saving mode information of the Femto BS 1204.

If the handover request signal includes short Femto BS ID information as the identifier of the Femto BS 1204, the macro BS 1202 identifies the BS ID of the Femto BS 1204.

If the Femto BS 1204 operates in an active mode, in step 1225, the macro BS 1202 performs the HO procedure for the Femto BS 1204 and the MS 1200 through the backbone network.

Also, the macro BS 1202 transmits a handover response signal to the MS 1200 in step 1227. Here, the handover response signal includes BS ID information of the Femto BS 1204, a center frequency of the Femto BS 1204, operation frequency information including a signal bandwidth of the Femto BS 1204, preamble sequence index information of the Femto BS 1204, etc.

Through the handover response signal, the MS 1200 identifies the BS ID, operation frequency information, and preamble sequence information of the Femto BS 1204.

Then, the MS 1200 initiates the HO procedure with the macro BS 1202 in step 1229, and performs a network entry procedure for handover through an operation frequency of the Femto BS 1204 in step 1231.

Regarding the aforementioned exemplary embodiment of the present invention, in the IEEE 802.16m standard, a standard improvement work for a procedure (step 1229) in which an MS notifies a serving BS of handover or non-handover is in progress. Thus, the procedure (step 1229) in which the MS notifies the serving BS of handover or non-handover can be changed in the future. In FIG. 12, illustration is based on a handover message sequence chart of the IEEE 802.16e standard. However, although there may be an omission or change of an operation of step 1229, it does not limit an operation of the present invention. Also, a feature of the present invention is equally applicable even to other communication systems and thus, although there may be an omission or change of the operation of step 1229, a handover process of the present invention can be performed.

In the aforementioned exemplary embodiment of the present invention, the Femto BS 1204 for handover of the MS 1200 operates in the active mode. Thus, the MS 1200, the macro BS 1202, and the Femto BS 1204 normally perform the HO procedure of the MS 1200.

Figure 13:
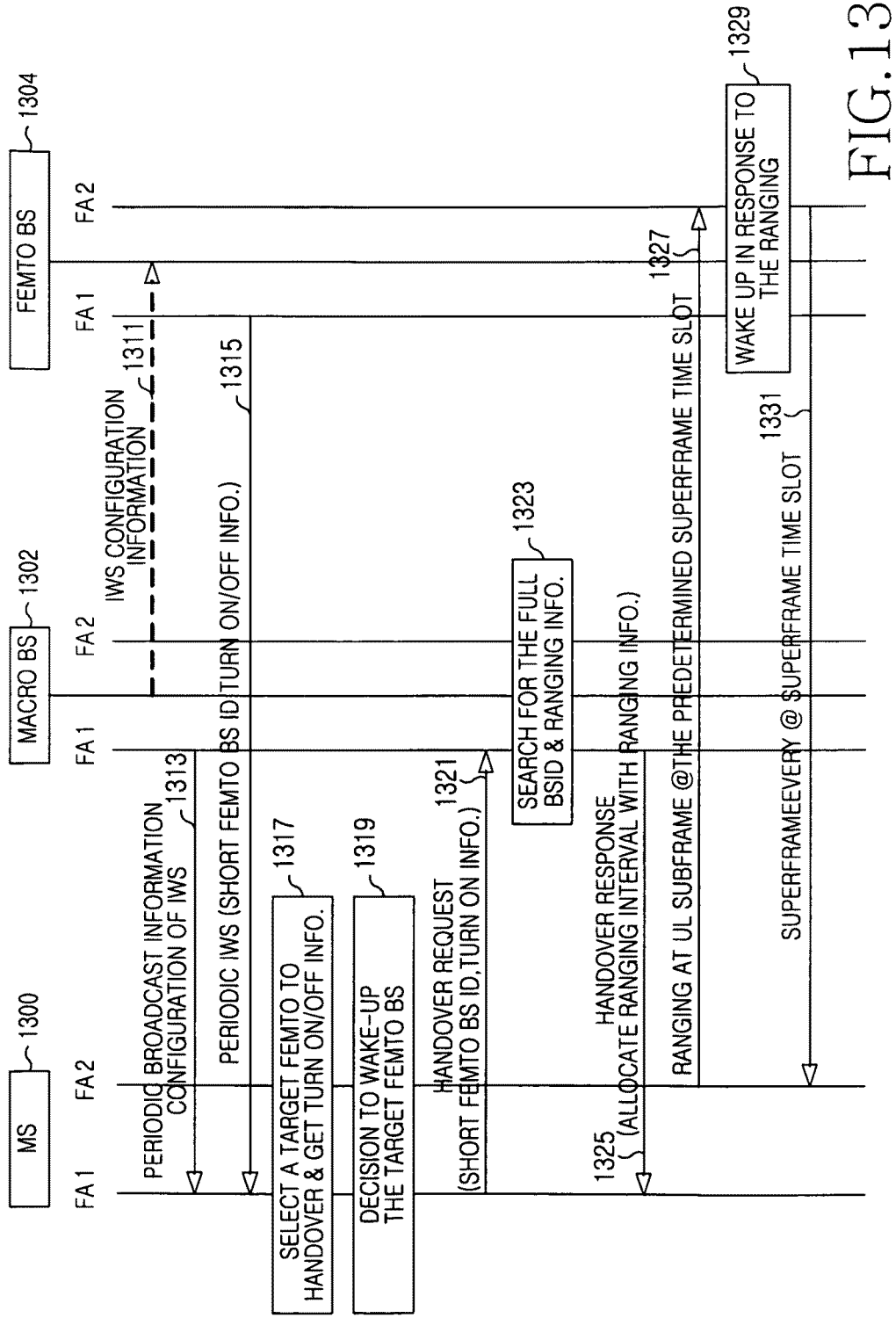
FIG. 13 illustrates a ladder diagram for a power saving mode control procedure using an IWS according to an exemplary embodiment of the present invention.

If the Femto BS 1204 operates in the power saving mode, the MS 1200 and the macro BS 1202 have to make the Femto BS 1204 transit to the active mode as illustrated in FIG. 13 below. Here, the active mode (or turn on mode) represents an operation mode in which the Femto BS 1204 normally operates. The power saving mode (or turn off mode) represents an operation mode in which the Femto BS 1204 powers off or stops signal transmission.

That is, to accomplish a power saving/active mode automatic transition function, the Femto BS 1204 adds indication information (i.e., an indicator bit) for its own operation state information to an IWS and transmits the indication information to the MS 1200. For example, if one bit of a turn on/off indicator representing the power saving mode on/off of the Femto BS is added to IWS information as illustrated in FIGS. 10A and 10B, it can represent operation state information of the Femto BS 1204. Here, the turn on/off indicator can be used as follows. Alternately, the contrary does not matter.

0: Active mode
1: Power saving mode

As described above, because the Femto BS 1204 transmits the operation state information through the IWS, the Femto BS 1204 can transmit the IWS even in the power saving mode. Thus, the MS 1200 can identify an operation state of the Femto BS 1204 through the turn on/off indicator included in the IWS.

If the Femto BS 1204 operates in the power saving mode, the MS 1200 can make the Femto BS 1204 transit to the active mode as follows. For example, the MS 1200 reports the power saving mode of the Femto BS 1204 to the macro BS 1202 so that the macro BS 1202 wakes up the Femto BS 1204. For another example, the MS 1200 may transmit a signal directly to the Femto BS 1204 to wake up the Femto BS 1204.

A method of making the Femto BS 1204 transit from the power saving mode to the active mode as above can be predefined in a standard or can be informed by the Femto BS 1204 to the MS 1200 through an IWS.

First, if the macro BS 1202 makes the Femto BS 1204 transit from the power saving mode to the active mode, the macro BS 1202 can follow as below.

1) The macro BS 1202 can transmit a message to the Femto BS 1204 through a wired network and make the Femto BS 1204 transit to the active mode.

2) The macro BS 1202 can transmit a signal to the Femto BS 1204 through a wireless network and make the Femto BS 1204 transit to the active mode. At this time, the macro BS 1202 and the Femto BS 1204 define a method for transmitting a signal for the sake of transition to the active mode. Also, the macro BS 1202 transmits a signal for the sake of transition to the active mode using any one of a downlink channel of the macro BS 1202, an uplink channel of the Femto BS 1204, and a separate exclusive wireless channel.

Second, if the MS 1200 makes the Femto BS 1204 transit from the power saving mode to the active mode, the MS 1200 transmits a signal that only the Femto BS 1204 can recognize. At this time, the signal transmitted by the MS 1200 to make the Femto BS 1204 transit to the active mode can follow below.

1) The signal can be transmitted using an operation frequency of the macro BS 1202, and the Femto BS 1204 can receive the signal using the operation frequency of the macro BS 1202.

2) The signal can be transmitted using an operation frequency of the Femto BS 1204, and the Femto BS 1204 can receive the signal using its own operation frequency.

3) The signal can be transmitted using a different frequency not used by the macro BS 1202 and the Femto BS 1204.

In this case, the MS 1200 transmits the signal for active mode transition using a time, frequency, and code (or ID) predefined with the Femto BS 1204. At this time, information for transmitting the signal for active mode transition can be informed the MS 1200 by the Femto BS 1204 through an IWS, or can be predefined through a standard, or can be informed the MS 1200 by the macro BS 1202. In the following description, active mode transition information denotes the information for transmitting the signal for active mode transition.

When the Femto BS 1204 supporting the power saving mode always opens a receive channel for at least one band, the Femto BS 1204 does not have to add the active mode transition information to the IWS. In another example, the Femto BS 1204 may selectively add a frequency band, sequence information for random access, and so forth, to the IWS.

Also, when active mode transition of the Femto BS 1204 supporting the power saving mode is performed through the wired network, the Femto BS 1204 does not have to add the active mode transition information to the IWS.

Also, when the Femto BS 1204 supporting the power saving mode periodically activates a receive channel, the Femto BS 1204 does not have to add the active mode transition information to the IWS if band information of the periodically activated receive channel and time information at which the receive channel is activated are predefined in a standard.

However, when the Femto BS 1204 transits to the active mode through the wireless network, the Femto BS 1204 can add the active mode transition information to the IWS to inform change information if there is a frequent change of an operation state of the receive channel, a change of an active mode transition period, or a change of a sequence for random access.

If the Femto BS 1204 operates in the power saving mode, the MS 1200 makes the Femto BS 1204 transit to the active mode and, after that, performs handover to the Femto BS 1204 or performs scanning for handover.

If the Femto BS 1204 operates in the power saving mode, the Femto BS 1204 does not transmit a signal through its own operation frequency but, during an IWS interval, transmits an IWS through an operation frequency of the macro BS 1202.

Also, the Femto BS 1204 can receive an active mode transition signal or active mode transition message from the macro BS 1202 or the MS 1200 and transit to the active mode. The following description is made on the assumption that the macro BS 1202 or the MS 1200 transmits the active mode transition signal.

If the macro BS 1204 transmits the active mode transition signal, the Femto BS 1204 can receive the active mode transition signal through a wired network or a wireless network.

Alternatively, if the MS 1200 transmits the active mode transition signal, the Femto BS 1204 can receive the active mode transition signal using any one of an operation frequency of the macro BS 1202, an operation frequency of the Femto BS 1204, and a separate frequency not used by the macro BS 1202 and the Femto BS 1204.

According to need, during the power saving mode, the Femto BS 1204 can transmit a preamble signal or pilot signal other than an IWS using its own frequency so that the MS 1200 can scan the signal transmitted by the Femto BS itself or transmit the active mode transition signal.

The Femto BS transiting from the active mode to the power saving mode operates as follows.

If the Femto BS operates in the active mode, the Femto BS provides service to MSs accessing the Femto BS itself. If there is no MS accessing the Femto BS during a predetermined time, the Femto BS transits to the power saving mode. At this time, the Femto BS may inform the macro BS or a network manager of power saving mode transition information.

FIG. 13 illustrates a power saving mode control procedure using an IWS according to an exemplary embodiment of the present invention.

Referring to FIG. 13, in steps 1311 and 1313, a macro BS 1302 transmits IWS configuration information to an MS 1300 receiving service from the macro BS itself and a Femto BS 1304. For example, the macro BS 1302 transmits the IWS configuration information to the Femto BS 1304 through a wireless link or backbone network. Also, the macro BS 1302 transmits the IWS configuration information to the MS 1300 through a periodically transmitted broadcasting signal. Here, the IWS configuration information includes information such as a super-frame index to transmit an IWS, a position of an IWS transmission resource within a super-frame, and so forth.

The Femto BS 1304 identifies an IWS interval through the IWS configuration information received from the macro BS 1302.

If the IWS interval arrives, in step 1315, the Femto BS 1304 transmits an IWS to the MS 1300 through an operation frequency (FA1) of the macro BS 1302. At this time, the Femto BS 1304 decides a transmit power of the IWS and an MCS level so that MSs positioned in a service area of the Femto BS itself can stably receive the IWS. Here, the IWS includes identifier information of the Femto BS 1304 and power saving mode information of the Femto BS 1304. The identifier information includes at least one of a BS ID of the Femto BS 1304, a short Femto BS ID of the Femto BS 1304, and a CSG identifier.

The MS 1300 determines if the IWS transmitted by the Femto BS 1304 is received during the IWS interval. When failing to receive the IWS during the IWS interval, the MS 1300 recognizes that it does not have to handover to the Femto BS 1304. That is, the MS 1300 maintains a connection with the macro BS 1302.

Alternatively, when receiving the IWS with no error, in step 1317, the MS 1300 acquires information for handover to the Femto BS 1304. For example, when receiving the IWS, the MS 1300 recognizes that the MS itself is located in a service area of the Femto BS 1304 and requires handover. The MS 1300 acquires the identifier information of the Femto BS 1304 and the power saving mode information of the Femto BS 1304 from the IWS. Here, the power saving mode information represents information on whether the Femto BS 1304 operates in a power saving mode.

If the MS 1300 receives IWSs from a plurality of Femto BSs, the MS 1300 may estimate a channel for each of the Femto BSs through the IWSs and decide a target Femto BS for handover.

If the Femto BS 1304 for handover of the MS 1300 operates in the power saving mode, in step 1319, the MS 1300 decides whether to make the Femto BS 1304 transit to an active mode.

If deciding to make the Femto BS 1304 transit to the active mode, in step 1321, the MS 1300 transmits a handover request signal including the identifier information of the Femto BS 1304 to the macro BS 1302. Here, the handover request signal includes the power saving mode information of the Femto BS 1304.

In step 1323, the macro BS 1302 identifies information on the Femto BS 1304 for handover of the MS 1300 through the handover request signal. Here, the information on the Femto BS 1304 includes the identifier information and power saving mode information of the Femto BS 1304 for handover of the MS 1300. For example, if short Femto BS ID information is included as an identifier of the Femto BS 1304, the macro BS 1302 identifies the BS ID of the Femto BS 1304. Also, if the Femto BS 1304 operates in the power saving mode, the macro BS 1302 identifies ranging information for making the Femto BS 1304 transit to the active mode. That is, if operating in the power saving mode, the Femto BS 1304 is activated only at a predefined time slot and transmits/receives a signal. Thus, the macro BS 1302 identifies interval information in which the Femto BS 1304 is activated.

In step 1325, the macro BS 1302 transmits a handover response signal to the MS 1300. Here, the handover response signal includes the ranging information for making the Femto BS 1304 transit to the active mode.

Through the handover response signal, the MS 1300 identifies the ranging information for making the Femto BS 1304 for handover transit to the active mode. Here, the ranging information includes the interval information in which the Femto BS 1304 can receive a signal, operation frequency information of the Femto BS 1304, ranging sequence information, and the like. The operation frequency information includes a center frequency of the Femto BS 1304 and a signal bandwidth of the Femto BS 1304.

If an interval in which the Femto BS 1304 can receive a signal arrives according to the ranging information, in step 1327, the MS 1300 attempts ranging to the Femto BS 71304. That is, the MS 1300 transmits a ranging request signal through an operation frequency of the Femto BS 1304.

For example, the MS 1300 can attempt ranging through a super-frame periodically communicated by the Femto BS 1304 during a scanning interval allocated from the macro BS 1302 and make the Femto BS 1304 transit to the active mode. For another example, all Femto BSs have a common ranging interval. Thus, through the common ranging interval, the MS 1300 can attempt ranging irrespective of a super-frame. In this case, the MS 1300 can reduce a time delay necessary for waiting up to a predefined super-frame to perform the ranging.

If the ranging request signal is received, the Femto BS 1304 transits to the active mode in step 1329, and transmits a super-frame every all time slots in step 1331.

Although not illustrated, after transmitting the ranging request signal, the MS 1300 determines if a ranging response signal is received from the Femto BS 1304 for a predetermined time. If the ranging response signal is not received for a predetermined time, the MS 1300 again transmits a ranging request signal to the Femto BS 1304 according to the ranging information. For another example, after transmitting the ranging request signal, the MS 1300 determines if a super-frame of the Femto BS 1304 is received for a predetermined time. If the super-frame is not received for a predetermined time, the MS 1300 again transmits a ranging request signal to the Femto BS 1304 according to the ranging information.

If retransmitting the ranging request signal as described above, the MS 1300 controls so that the number of times of retransmission of the ranging request signal does not exceed the reference number of times of retransmission. If the number of times of retransmission of the ranging request signal exceeds the reference number of times of retransmission, the MS 1300 reports a ranging request signal transmission failure to the macro BS 1302 and maintains a communication with the macro BS 1302. In another example, while transmitting the ranging request signal, upon failure of receiving an IWS of the Femto BS 1304, failure of decoding the IWS, or failure of scanning the Femto BS 1304, the MS 1300 reports the ranging request signal transmission failure to the macro BS 1302 and maintains the communication with the macro BS 1302.

In the aforementioned exemplary embodiment of the present invention, if the Femto BS 1304 for handover operates in the power saving mode, the MS 1300 transmits the ranging request signal for making the Femto BS 1304 transit to the active mode to the Femto BS 1304 according to the ranging information of the Femto BS 1304.

In another exemplary embodiment of the present invention, if a Femto BS 1304 for handover operates in a power saving mode, an MS 1300 may request a macro BS 1302 for operation transition of the Femto BS 1304.

Also, in the aforementioned exemplary embodiment of the present invention, the Femto BS 1304 operating in the power saving mode transmits a super-frame only at a predefined time slot. At this time, all Femto BSs operating in the power saving mode can simultaneously transmit super-frames at a predefined time slot.

The macro BS 1302 can transmit time slot information at which the Femto BS 1304 transmits a super-frame, to MSs through a broadcasting signal.

In another exemplary embodiment of the present invention, Femto BSs operating in a power saving mode can set, by group, a time slot for transmitting a super-frame. That is, one Femto BS group selects one of time slots of 'N' times for transmitting a super-frame during one second and transmits the super-frame. At this time, the Femto BSs transmit the super-frame at a time slot at which a result of a modulo operation of their own BS IDs and 'N' is the same as a result of a modulo operation of an index of the super-frame depending on the time slot and N.

The following description is for a method in which the macro MS performs handover to the Femto BS using an IWS received from the Femto BS. The following description is made on the assumption that the Femto BS transmits an IWS configured as in FIG. 10B. Also, it is assumed that an operation frequency of the macro BS is equal to 'FA1', and an operation frequency of the Femto BS is equal to 'FA2'.

Figure 14:
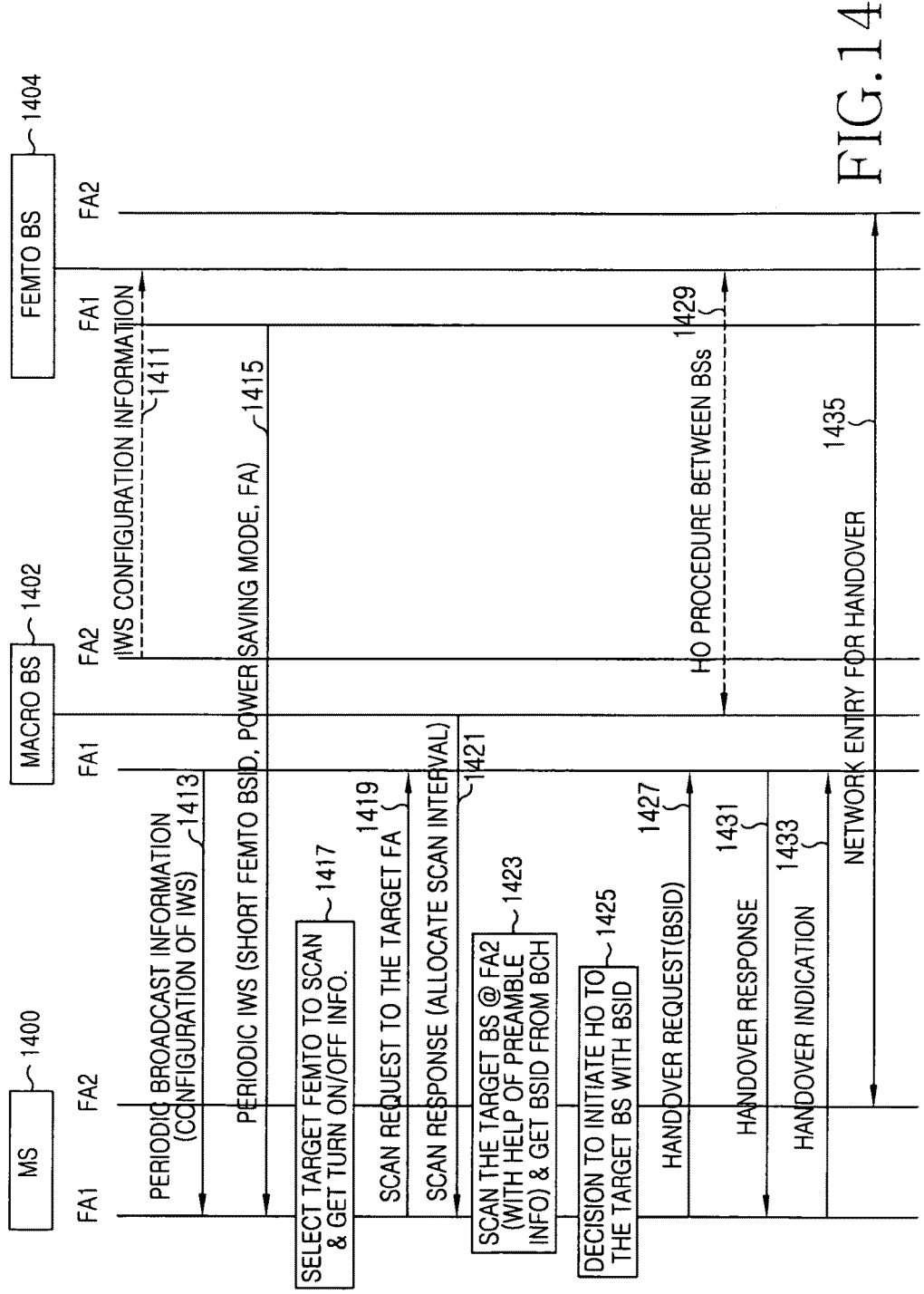
FIG. 14 illustrates a ladder diagram for a handover procedure using an IWS according to an exemplary embodiment of the present invention.

FIG. 14 illustrates a HO procedure using an IWS according to another exemplary embodiment of the present invention.

Referring to FIG. 14, in steps 1411 and 1413, a macro BS 1402 transmits IWS configuration information to an MS 1400 receiving service from the macro BS itself and a Femto BS 1404. For example, the macro BS 1402 transmits the IWS configuration information to the Femto BS 1404 through a wireless link or backbone network. Also, the macro BS 1402 transmits the IWS configuration information to the MS 1400 through a periodically transmitted broadcasting signal. Here, the IWS configuration information includes information such as a super-frame index to transmit an IWS, a position of an IWS transmission resource within a super-frame, and so forth.

The Femto BS 1404 identifies an IWS interval through the IWS configuration information received from the macro BS 1402.

If the IWS interval arrives, in step 1415, the Femto BS 1404 transmits an IWS to the MS 1400 through an operation frequency (FA1) of the macro BS 1402. At this time, the Femto BS 1404 decides a transmit power of the IWS and an MCS level so that MSs positioned in a service area of the Femto BS itself can stably receive the IWS. Here, the IWS includes identifier information of the Femto BS 1404 and power saving mode information of the Femto BS 1404. The identifier information includes at least one of a BS ID of the Femto BS 1404, a short Femto BS ID of the Femto BS 1404, and a CSG identifier.

The MS 1400 determines if the IWS transmitted by the Femto BS 1404 is received during the IWS interval. If failing to receive the IWS during the IWS interval, the MS 1400 recognizes that it does not have to handover to the Femto BS 1404. Thus, the MS 1400 maintains a connection with the macro BS 1402.

Alternatively, if the IWS is received with no error, in step 1417, the MS 1400 decides a candidate target Femto BS enabling handover as the Femto BS 1404. That is, if the IWS is received with no error, the MS 1400 recognizes that the MS itself is located in a service area of the Femto BS 1404 and requires handover. Thus, the MS 1400 estimates a channel for the Femto BS through the IWS and decides candidate target Femto BSs enabling handover.

Also, the MS 1400 acquires the identifier information of the Femto BS transmitting the IWS and the power saving mode information of the Femto BS from the received IWS.

In step 1419, the MS 1400 transmits a scanning request signal to the macro BS 1402 to scan the candidate target Femto BSs. Here, the scanning request signal includes identifier information of the candidate target Femto BSs and power saving mode information.

Through the scanning request signal, the macro BS 1402 identifies information on the candidate target Femto BSs set by the MS 1400. Here, the information on the Femto BS 1404 includes the identifier information of the Femto BS 1404 for handover of the MS 1400 and the power saving mode information.

Also, if the scanning request signal is received, the macro BS 1402 sets a scanning interval of the MS 1400.

In step 1421, the macro BS 1402 transmits a scanning response signal to the MS 1400. Here, the scanning response signal includes scanning interval information of the MS 1400, operation frequency information of the candidate target Femto BSs, and preamble sequence information of the candidate target Femto BSs. The operation frequency information includes a center frequency of the Femto BS and signal bandwidth information of the Femto BS.

Through the scanning response signal, the MS 1400 identifies the operation frequency information of the candidate target Femto BSs, the preamble sequence information of the candidate target Femto BSs, and the scanning interval information of the MS 1400.

In step 1423, during the identified scanning interval, the MS 1400 scans the candidate target Femto BSs and decides the target Femto BS 1404. At this time, the MS 1400 scans the candidate target Femto BSs using the operation frequency information of the candidate target Femto BSs and the preamble sequence information of the candidate target Femto BSs.

Also, the MS 1400 may identify BS IDs of the candidate target Femto BSs from broadcasting information of the candidate target Femto BSs through scanning.

If the MS 1400 decides to initiate handover in step 1425, the MS 1400 transmits a handover request signal including a BS ID of the Femto BS 1404 to the macro BS 1402 in step 1427. Here, the handover request signal may include the power saving mode information of the Femto BS 1404.

Through the handover request signal, the macro BS 1402 identifies the Femto BS 1404 for handover of the MS 1400 and the power saving mode information of the Femto BS 1404.

If the Femto BS 1404 operates in an active mode, in step 1429, the macro BS 1402 performs a HO procedure for the Femto BS 1404 and the MS 1400 through the backbone network.

In step 1431, the macro BS 1402 transmits a handover response signal to the MS 1400.

In step 1433, the MS 1400 initiates the HO procedure with the macro BS 1402.

Then, in step 1435, the MS 1400 performs a network entry procedure for handover through an operation frequency of the Femto BS 1404.

Regarding the aforementioned exemplary embodiment of the present invention, in the IEEE 802.16m standard, a standard improvement work for a procedure (step 1433) in which an MS notifies a serving BS of handover or non-handover is in progress. Accordingly, the procedure (step 1433) in which the MS notifies the serving BS of handover or non-handover can be changed in the future. In FIG. 14, illustration is based on a handover message sequence chart of the IEEE 802.16e standard. However, although there may be an omission or change of an operation of step 1433, it does not limit an operation of the present invention. Also, a feature of the present invention is equally applicable even to other communication systems and thus, although there may be an omission or change of the operation of step 1433, a handover process of the present invention can be performed.

In the aforementioned exemplary embodiment of the present invention, the Femto BS 1404 transmits an IWS including the identifier information of the Femto BS 1404 and the power saving mode information of the Femto BS 1404.

In another exemplary embodiment of the present invention, a Femto 1404 may transmit an IWS including preamble sequence information of the Femto BS 1404 and power saving mode information of the Femto BS 1404. In this case, an MS 1400, a macro BS 1402, and the Femto BS 1404 perform the same operation as those of FIG. 14.

In the aforementioned exemplary embodiment of the present invention, the Femto BS 1404 for handover of the MS 1400 operates in the active mode.

Figure 15:
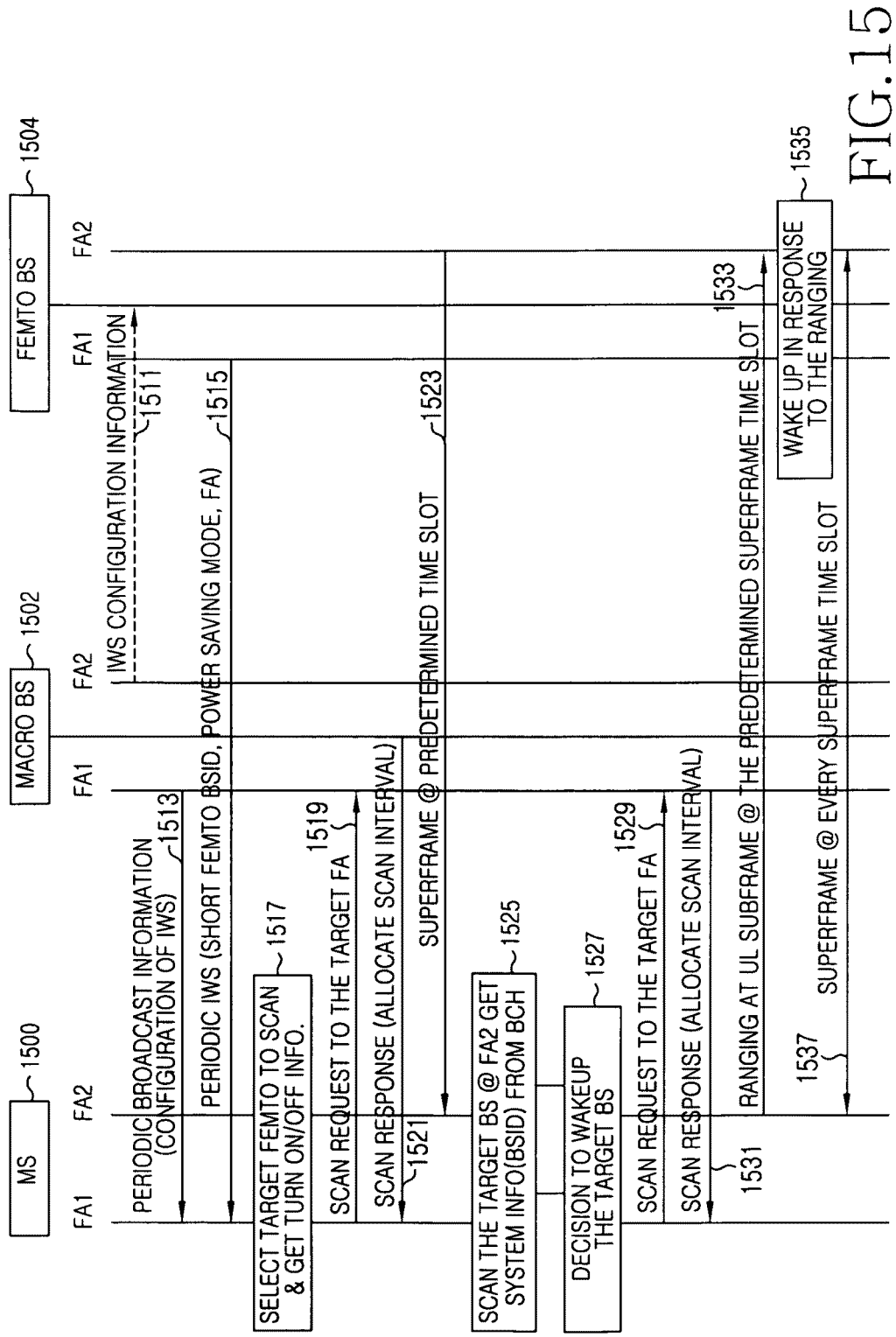
FIG. 15 illustrates a ladder diagram for a power saving mode control procedure using an IWS according to an exemplary embodiment of the present invention.

If the Femto BS 1404 operates in a power saving mode, the MS 1400 and the macro BS 1402 operate as illustrated in FIG. 15 below.

FIG. 15 illustrates a power saving mode control procedure using an IWS according to another exemplary embodiment of the present invention.

Referring to FIG. 15, in steps 1511 and 1513, a macro BS 1502 transmits IWS configuration information to an MS 1500 receiving service from the macro BS itself and a Femto BS 1504. For example, the macro BS 1502 transmits the IWS configuration information to the Femto BS 1504 through a wireless link or backbone network. Also, the macro BS 1502 transmits the IWS configuration information to the MS 1500 through a periodically transmitted broadcasting signal. Here, the IWS configuration information includes information such as a super-frame index to transmit an IWS, a position of an IWS transmission resource within a super-frame, and so forth.

The Femto BS 1504 identifies an IWS interval through the IWS configuration information received from the macro BS 1502.

If the IWS interval arrives, in step 1515, the Femto BS 1504 transmits an IWS to the MS 1500 through an operation frequency (FA1) of the macro BS 1502. At this time, the Femto BS 1504 decides a transmit power of the IWS and an MCS level so that MSs positioned in a service area of the Femto BS can stably receive the IWS. Here, the IWS includes identifier information of the Femto BS 1504 and power saving mode information of the Femto BS 1504. The identifier information includes at least one of a BS ID of the Femto BS 1504, a short Femto BS ID of the Femto BS 1504, and a CSG identifier.

The MS 1500 determines if the IWS transmitted by the Femto BS 1504 is received during the IWS interval. If the IWS is not received during the IWS interval, the MS 1500 recognizes that it does not have to handover to the Femto BS 1504. Thus, the MS 1500 maintains a connection with the macro BS 1502.

Alternatively, if the IWS is received with no error, in step 1517, the MS 1500 decides a candidate target Femto BS enabling handover as the Femto BS 1504. That is, if the IWS is received with no error, the MS 1500 recognizes that the MS itself is located in a service area of the Femto BS 1504 and requires handover. Thus, the MS 1500 estimates a channel for the Femto BS through the IWS and decides the candidate target Femto BSs enabling handover.

Also, the MS 1500 acquires the identifier information of the Femto BS transmitting the IWS and the power saving mode information of the Femto BS from the IWS.

In step 1519, the MS 1500 transmits a scanning request signal to the macro BS 1502 to scan the candidate target Femto BSs. Here, the scanning request signal includes identifier information and power saving mode information of the candidate target Femto BSs and power saving mode operation request information of the Femto BS. The power saving mode operation request information means information for requesting, by the MS 1500, the macro BS 1502 for power saving mode operation information of the Femto BS so that the Femto BS operating in a power saving mode can transmit an active mode transition request signal.

Through the scanning request signal, the macro BS 1502 identifies information on the candidate target Femto BSs set by the MS 1500. Here, the information of the Femto BS 1504 includes the identifier information of the Femto BS 1504 for handover of the MS 1500 and the power saving mode information.

Also, if the scanning request signal is received, the macro BS 1502 sets a scanning interval of the MS 1500. That is, if the Femto BS 1504 operates in the power saving mode, the Femto BS 1504 is activated only at a predefined time slot and transmits/receives a signal. Thus, the macro BS 1502 sets the scanning interval of the MS 1500 considering a time slot at which the Femto BS operating in the power saving mode is activated.

In step 1521, the macro BS 1502 transmits a scanning response signal to the MS 1500. Here, the scanning response signal includes scanning interval information of the MS 1500, operation frequency information of the candidate target Femto BSs, and preamble sequence information of the candidate target Femto BSs. The operation frequency information includes a center frequency of the Femto BS and signal bandwidth information of the Femto BS.

Through the scanning response signal received from the macro BS 1502, the MS 1500 identifies the operation frequency information of the candidate target Femto BSs, the preamble sequence information of the candidate target Femto BSs, and the scanning interval information of the MS 1500.

During the identified scanning interval, the MS 1500 scans the candidate target Femto BSs using the operation frequency information of the candidate target Femto BSs and the preamble sequence information of the candidate target Femto BSs. At this time, the macro BS 1502 sets the scanning interval considering the time slot at which the Femto BS operating in the power saving mode is activated. Thus, the MS 1500 can scan information on the Femto BS operating in the power saving mode.

In step 1525, the MS 1500 decides a target Femto BS 1504 for handover depending on the scanning information of the candidate target Femto BSs.

Also, according to need, the MS 1500 may identify BS IDs of the candidate target Femto BSs from broadcasting information of the candidate target Femto BSs through the scanning.

If the Femto BS 1504 operates in the power saving mode, in step 1527, the MS 1500 decides whether to make the Femto BS 1504 transit to an active mode.

When deciding to make the Femto BS 1504 transit to the active mode, in step 1529, the MS 1500 transmits a scanning request signal to the macro BS 1502 to acquire scanning interval information for ranging signal transmission to the Femto BS 1504. Here, the scanning request signal can include the power saving mode information of the Femto BS 1504.

If the scanning request signal is received, the macro BS 1502 sets a scanning interval of the MS 1500. If the Femto BS 1504 operates in the power saving mode, the Femto BS 1504 is activated only at a predefined time slot and transmits/receives a signal. Thus, the macro BS 1502 sets the scanning interval of the MS 1500 considering a time slot at which the Femto BS 1504 is activated.

For example, the MS 1500 can attempt ranging through a super-frame periodically communicated by the Femto BS 1504 during a scanning interval allocated from the macro BS 1502 and make the Femto BS 1504 transit to the active mode. For another example, all Femto BSs have a common ranging interval. Thus, through the common ranging interval, the MS 1500 can attempt ranging irrespective of a super-frame. In this case, the MS 1500 can reduce a time delay necessary for waiting up to a predefined super-frame to perform the ranging.

In step 1531, the macro BS 1502 transmits a scanning response signal including the scanning interval information of the MS 1500, to the MS 1500.

Through the scanning response signal, the MS 1500 identifies the scanning interval information for ranging signal transmission.

During the identified scanning interval, the MS 1500 may scan the Femto BS 1504 and identify an uplink sub-frame in which the Femto BS 1504 can receive a signal.

In step 1533, the MS 1500 transmits the ranging request signal through the uplink sub-frame.

If the ranging request signal is received, the Femto BS 1504 transits to the active mode in step 1535, and transmits a super-frame every all time slots in step 1537.

Although not illustrated, after transmitting the ranging request signal, the MS 1500 determines if the ranging response signal is received from the Femto BS 1504 for a predetermined time. If the ranging response signal is not received for a predetermined time, the MS 1500 again transmits a ranging request signal to the Femto BS 1504 according to the ranging information. For another example, after transmitting the ranging request signal, the MS 1500 determines if a super-frame of the Femto BS 1504 is received for a predetermined time. If the super-frame is not received for a predetermined time, the MS 1500 again transmits a ranging request signal to the Femto BS 1504 according to the ranging information.

If retransmitting the ranging request signal as described above, the MS 1500 controls so that the number of times of retransmission of the ranging request signal does not exceed the reference number of times of retransmission. If the number of times of retransmission of the ranging request signal exceeds the reference number of times of retransmission, the MS 1500 reports a ranging request signal transmission failure to the macro BS 1502 and maintains a communication with the macro BS 1502. In another example, while transmitting the ranging request signal, upon failure of receiving an IWS of the Femto BS 1504, failure of decoding the IWS, or failure of scanning the Femto BS 1504, the MS 1500 reports the ranging request signal transmission failure to the macro BS 1502 and maintains the communication with the macro BS 1502.

In the aforementioned exemplary embodiment of the present invention, if the Femto BS 1504 for handover operates in the power saving mode, the MS 1500 transmits the ranging request signal for making the Femto BS 1504 transit to the active mode to the Femto BS 1504 according to the ranging information of the Femto BS 1504.

In another exemplary embodiment of the present invention, if a Femto BS 1504 for handover operates in the power saving mode, an MS 1500 may request a macro BS 1502 for operation transition of the Femto BS 1504.

If all Femto BSs operating in a power saving mode are activated simultaneously at a predefined time slot, a macro BS may transmit time slot information at which the Femto BSs are activated, to MSs through a broadcasting signal.

In another example, Femto BSs operating in a power saving mode can set, by group, a time slot for transmitting a super-frame. That is, one Femto BS group selects one of time slots of 'N' times for transmitting a super-frame during one second and transmits the super-frame. At this time, the Femto BSs transmit the super-frame at a time slot at which a result of a modulo operation of their own BS IDs and 'N' is the same as a result of a modulo operation of an index of the super-frame depending on the time slot and 'N'.

Also, in the aforementioned exemplary embodiment of the present invention, the Femto BS 1504 transmits an IWS including its own identifier information and its own power saving mode information. In another exemplary embodiment of the present invention, a Femto BS 1504 may transmit an IWS including its own preamble sequence information and its own power saving mode information.

The following description is for a method in which the macro BS sets IWS configuration information.

Figure 16:
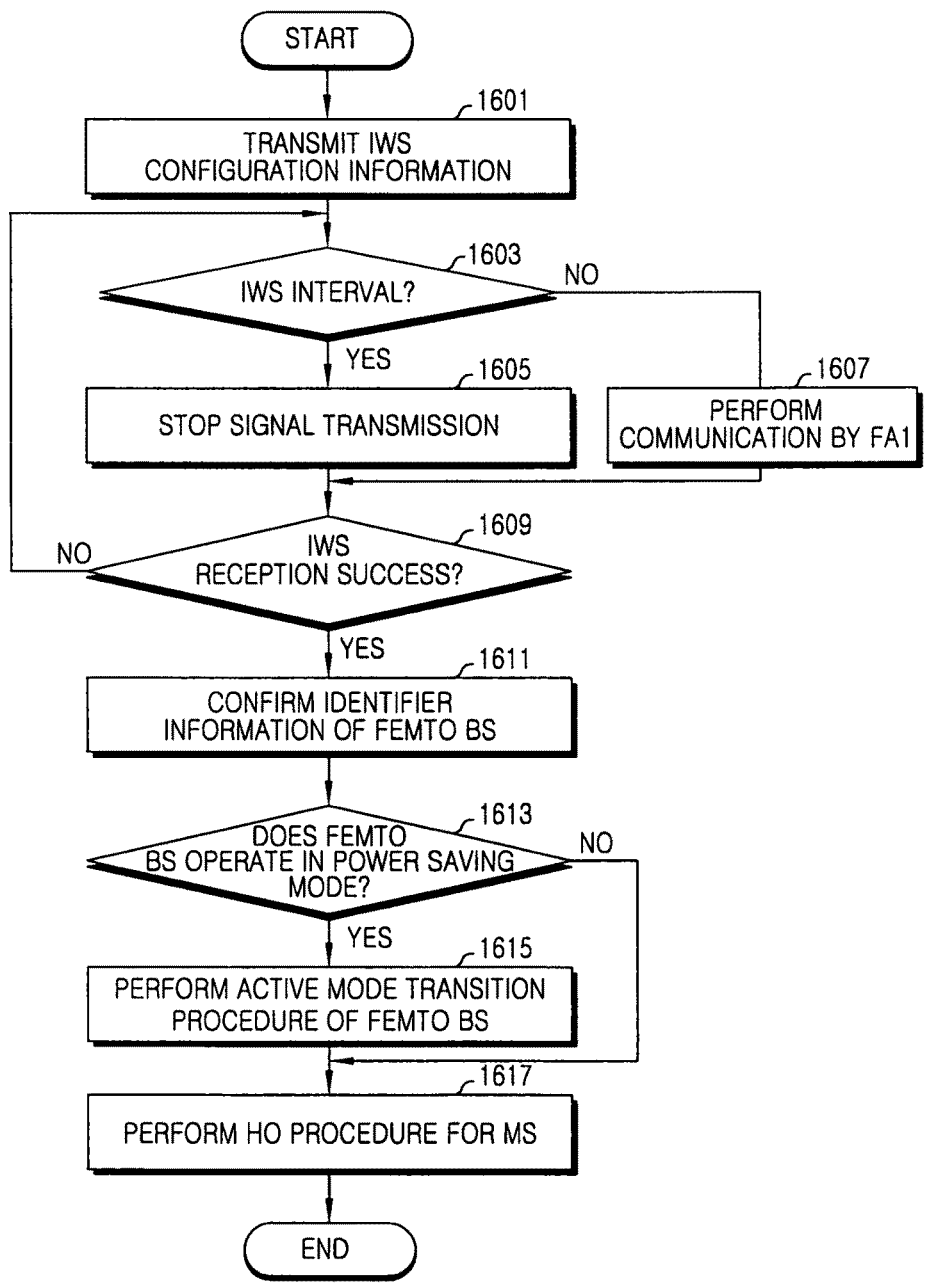
FIG. 16 illustrates a flow diagram of a procedure of transmitting a signal considering an IWS interval in a macro BS according to an exemplary embodiment of the present invention.

FIG. 16 illustrates a procedure of transmitting a signal considering an IWS interval in a macro BS according to an exemplary embodiment of the present invention.

Referring to FIG. 6, in step 1601, the macro BS transmits IWS configuration information set by the macro BS itself to macro MSs and Femto BSs. For example, the macro BS transmits the IWS configuration information to the Femto BSs through a wireless link or backbone network. Also, the macro BS transmits the IWS configuration information to the macro MSs through a periodically transmitted broadcasting signal. Here, the IWS configuration information includes information such as a super-frame index to transmit an IWS, a position of an IWS transmission resource within a super-frame, etc.

Then, the macro BS proceeds to step 1603 and determines if a time slot arriving according to the IWS configuration information is set as an IWS interval.

If the arriving time slot is not equal to the IWS interval, the macro BS proceeds to step 1607 and provides service to the macro MSs using its own operation frequency (FA1).

Alternatively, if the arriving time slot is equal to the IWS interval, the macro BS proceeds to step 1605 and stops signal transmission. That is, during the IWS interval, Femto BSs, which are located in the macro cell, transmit IWSs using the operation frequency (FA1) of the macro BS. Thus, during the IWS interval, the macro BS does not transmit a signal through the operation frequency (FA1).

Then, the macro BS proceeds to step 1609 and determines if the macro MS receives the IWS with no error. That is, if receiving the IWS with no error, the macro MS transmits information on the Femto BS transmitting the IWS, to the macro BS. Thus, if the Femto BS information is received from the macro MS, the macro BS recognizes that the macro MS receives the IWS with no error. Here, the Femto BS information includes identifier information of the Femto BS and power saving mode information of the Femto BS. The identifier information includes a BS ID of the Femto BS, a short Femto BS ID, a CSG identifier, and so forth. The power saving mode information includes information on whether the Femto BS operates in a power saving mode.

If the macro MS fails to receive the IWS, the macro BS returns to step 1603 and determines if an arriving time slot is set as the IWS interval.

Alternatively, if the macro MS receives the IWS with no error, the macro BS proceeds to step 1611 and, through the Femto BS information transmitted by the macro MS, confirms the identifier information of the Femto BS for handover of the macro MS. At this time, if the identifier information of the Femto BS includes the short Femto BS ID information, the macro BS confirms the BS ID of the Femto BS.

Then, the macro BS proceeds to step 1613 and, through the Femto BS information, determines if the Femto BS operates in the power saving mode.

If the Femto BS operates in an active mode, the macro BS proceeds to step 1617 and performs a series of procedures for making the macro MS handover to the Femto BS. For example, if setting the IWS as a handover initiation condition as illustrated in FIGS. 12 and 13, the macro BS performs a series of procedures for making the macro MS handover to the Femto BS. Alternatively, if setting the IWS as an initiation condition of a scanning procedure for handover as illustrated in FIGS. 14 and 15, the macro BS sets a scanning interval for the macro MS. Then, if determining that there is a need for handover of the macro MS, the macro BS performs a series of procedures for making the macro MS handover to the Femto BS.

Alternatively, if the Femto BS operates in the power saving mode in step 1613, the macro BS proceeds to step 1615 and performs a series of procedures for making the Femto BS transit to the active mode. For example, the macro BS controls the macro MS so that the macro MS can transmit an active mode transition signal to the Femto BS. For another example, the macro BS transmits an active mode transition signal to the Femto BS through a wireless link or a backbone network.

If the Femto BS transits to the active mode, the macro BS proceeds to step 1617 and performs a series of procedures for making the macro MS handover to the Femto BS.

Then, the macro BS terminates the procedure according to an exemplary embodiment of the present invention.

The following description is for a method in which the Femto BS transmits an IWS. If the Femto BS operates in an active mode, the Femto BS operates as illustrated in FIG. 17 below.

Figure 17:
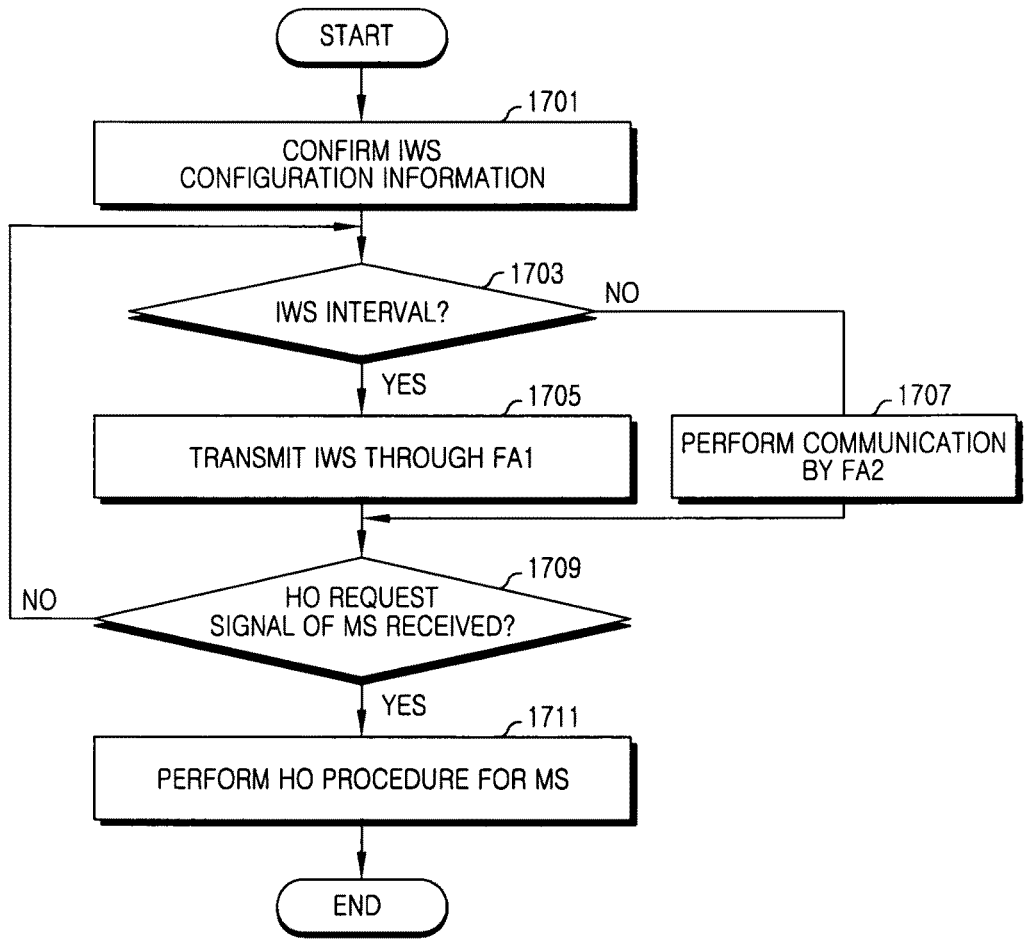
FIG. 17 illustrates a flow diagram of a procedure of transmitting a signal considering an IWS interval in a Femto BS that operates in an active mode according to an exemplary embodiment of the present invention.

FIG. 17 illustrates a procedure of transmitting a signal considering an IWS interval in a Femto BS that operates in an active mode according to an exemplary embodiment of the present invention.

Referring to FIG. 17, in step 1701, the Femto BS confirms IWS configuration information. For example, the Femto BS receives the IWS configuration information from a macro BS through a wireless link or backbone network. Here, the IWS configuration information includes information on a super-frame index to transmit an IWS, a position of an IWS transmission resource within a super-frame, and so forth.

Then, the Femto BS proceeds to step 1703 and determines if a time slot arriving according to the IWS configuration information is set as an IWS interval.

If the arriving time slot is set as the IWS interval, the Femto BS proceeds to step 1705 and transmits an IWS through an operation frequency (FA1) of the macro BS. At this time, the Femto BS sets a transmit power of the IWS and an MCS level and transmits the IWS so that MSs located within a service area of the Femto BS itself can stably receive the IWS. Here, the IWS includes identifier information of the Femto BS and power saving mode information of the Femto BS. The identifier information means a BS ID of the Femto BS, a short Femto BS ID of the Femto BS, a CSG identifier, and so forth.

Alternatively, if the arriving time slot is not set as the IWS interval, the Femto BS proceeds to step 1707 and provides service to Femto MSs using its own operation frequency (FA2).

Then, the Femto BS proceeds to step 1709 and determines if a handover request signal for a macro MS is received.

If the handover request signal is not received, the Femto BS returns to step 1703 and determines if a time slot arriving according to the IWS configuration information is set as the IWS interval.

Alternatively, if receiving the handover request signal, the Femto BS recognizes that the macro MS requesting for handover moves to a service area of the Femto BS itself. Thus, the Femto BS proceeds to step 1711 and performs a HO procedure so that the macro MS can access the Femto BS.

Then, the Femto BS terminates the procedure according to an exemplary embodiment of the present invention.

Figure 18:
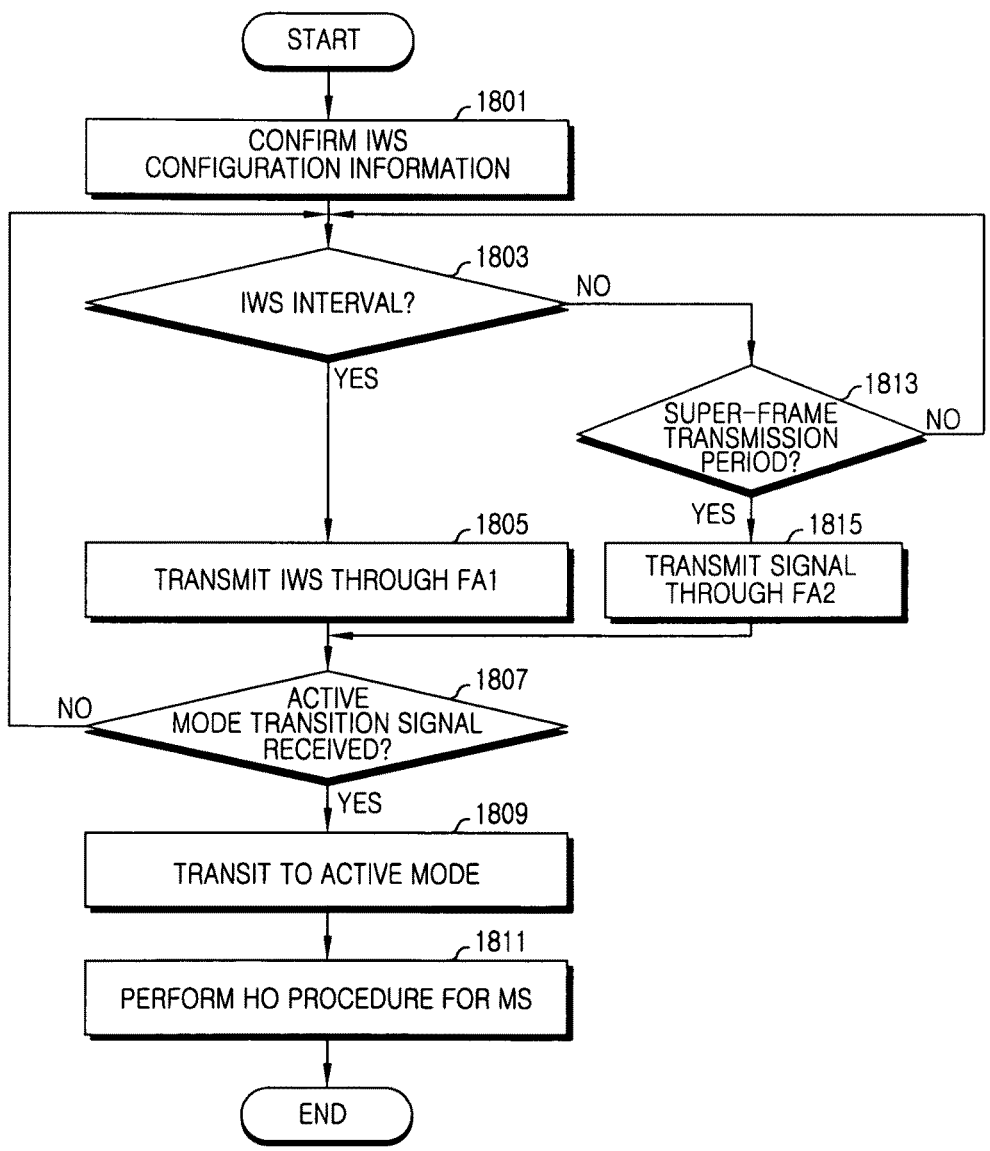
FIG. 18 illustrates a flow diagram of a procedure of transmitting a signal considering an IWS interval in a Femto BS that operates in a power saving mode according to an exemplary embodiment of the present invention.

If a Femto BS operates in a power saving mode, the Femto BS operates as illustrated in FIG. 18 below.

FIG. 18 illustrates a procedure of transmitting a signal considering an IWS interval in a Femto BS that operates in a power saving mode according to an exemplary embodiment of the present invention.

Referring to FIG. 18, in step 1801, the Femto BS confirms IWS configuration information. For example, the Femto BS receives the IWS configuration information from a macro BS through a wireless link or a backbone network. Here, the IWS configuration information includes information such as a super-frame index to transmit an IWS, a position of an IWS transmission resource within a super-frame, and so forth.

Then, the Femto BS proceeds to step 1803 and determines if a time slot arriving according to the IWS configuration information is set as an IWS interval.

If the arriving time slot is not set as the IWS interval, the Femto BS proceeds to step 1813 and determines if the arriving time slot is set as an interval for transmitting a super-frame.

If the arriving time slot is set as the interval for transmitting the super-frame, the Femto BS proceeds to step 1815 and transmits a super-frame through its own operation frequency (FA2).

Alternatively, if the arriving time slot is not set as the interval for transmitting the super-frame in step 1813, the Femto BS operates in the power saving mode.

Then, the Femto BS returns to step 1803 and determines if a time slot arriving according to the IWS configuration information is set as the IWS interval.

Alternatively, if the arriving time slot is set as the IWS interval in step 1803, the Femto BS proceeds to step 1805 and transmits the IWS using an operation frequency (FA1) of the macro BS. At this time, the Femto BS sets a transmit power of the IWS and an MCS level and transmits the IWS so that MSs located in a serving area of the Femto BS itself can stably receive the IWS. Here, the IWS includes identifier information of the Femto BS and power saving mode information of the Femto BS. The identifier information represents a BS ID of the Femto BS, a short Femto BS ID of the Femto BS, a CSG identifier, and the like.

Then, the Femto BS proceeds to step 1807 and determines if an active mode transition signal is received from a macro MS receiving the transmitted IWS or a macro BS.

When failing to receive the active mode transition signal, the Femto BS returns to step 1803 and determines if a time slot arriving according to the IWS configuration information is set as the IWS interval.

Alternatively, if receiving the active mode transition signal, the Femto BS proceeds to step 1809 and transits to an active mode. At this time, the Femto BS transmits a super-frame every all time slots.

Then, if the macro MS requests for handover, the Femto BS recognizes that the macro MS moves to a service area of the Femto BS itself. Thus, the Femto BS proceeds to step 1811 and performs a HO procedure for the macro MS.

Then, the macro BS terminates the procedure according to an exemplary embodiment of the present invention.

The following description is for a method in which the macro MS performs handover to the Femto BS through an IWS.

Figure 19:
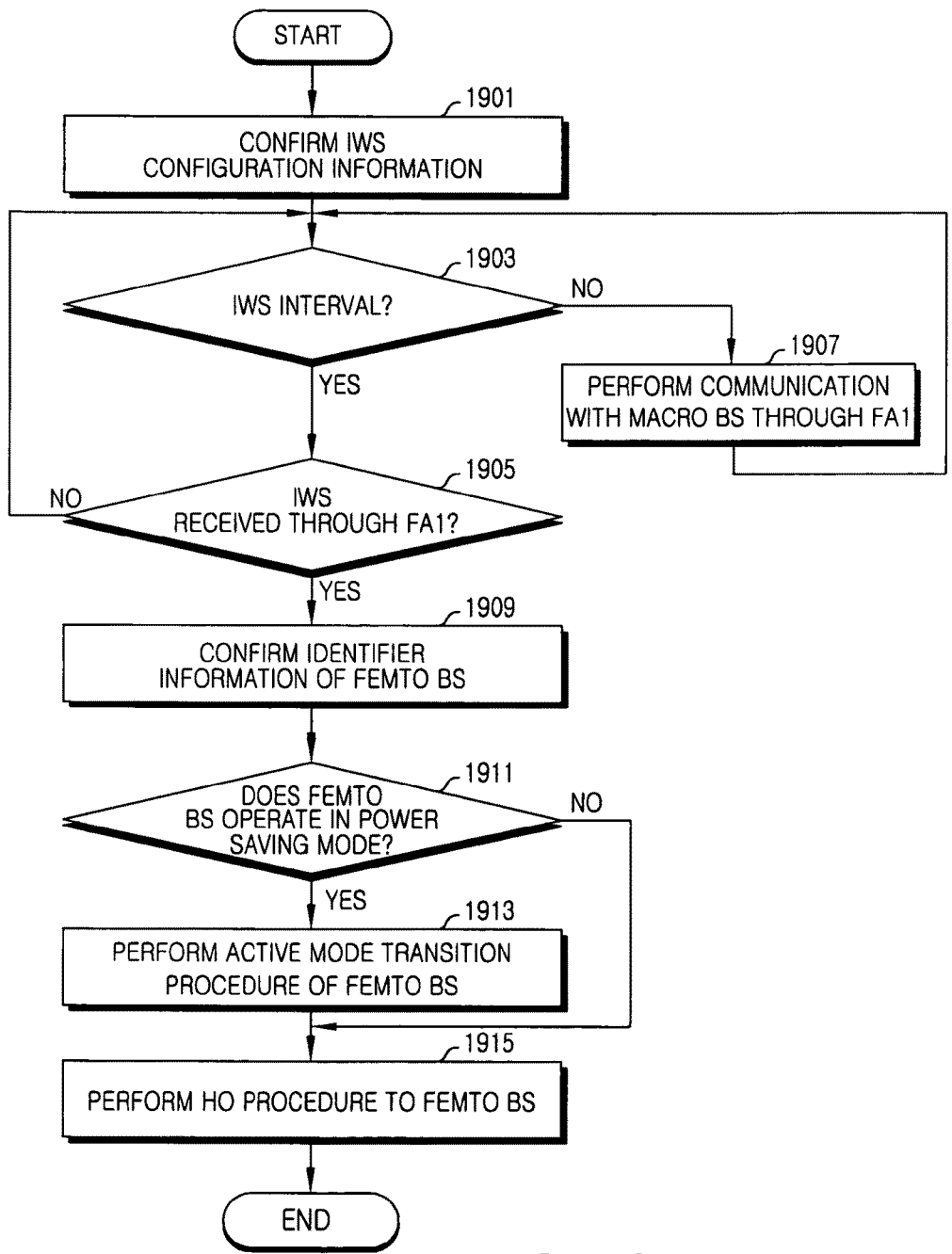
FIG. 19 illustrates a flow diagram of a procedure of performing handover using an IWS in a MS according to an exemplary embodiment of the present invention.

FIG. 19 illustrates a procedure of performing handover using an IWS in an MS according to an exemplary embodiment of the present invention.

Referring to FIG. 19, in step 1901, the MS confirms IWS configuration information. For example, the MS receives service from a macro BS. Thus, the MS receives the IWS configuration information through a broadcasting signal periodically transmitted by the macro BS. Here, the IWS configuration information includes information such as a super-frame index to transmit an IWS, a position of an IWS transmission resource within a super-frame, and so forth.

Then, the MS proceeds to step 1903 and determines if a time slot arriving according to the IWS configuration information is set as an IWS interval.

If the arriving time slot is not equal to the IWS interval, the MS proceeds to step 1907 and receives service from the macro BS through an operation frequency (FA1) of the macro BS.

Then, the MS returns to step 903 and determines if a time slot arriving according to the IWS configuration information is set as the IWS interval.

Alternatively, if the arriving time slot is set as the IWS interval, the MS proceeds to step 1905 and determines if an IWS transmitted by the Femto BS is received through the operation frequency (FA1) of the macro BS.

If the IWS is not received, the MS returns to step 1903 and determines if a time slot arriving according to the IWS configuration information is set as the IWS interval.

Alternatively, if receiving the IWS, the MS proceeds to step 1909 and acquires information for handover to the Femto BS transmitting the IWS. For example, if receiving the IWS, the MS recognizes that it can handover to the Femto BS transmitting the IWS. Also, the MS acquires the identifier information of the Femto BS from the IWS. Here, the identifier information includes a BS ID of the Femto BS, a short Femto BS ID of the Femto BS, a CSG identifier, and the like.

Then, the MS proceeds to step 1911 and determines if the Femto BS operates in the power saving mode through the IWS.

If the Femto BS operates in an active mode, the MS proceeds to step 1915 and performs a HO procedure to the Femto BS. For example, if setting the IWS as a handover initiation condition as illustrated in FIGS. 12 and 13, the MS performs a series of procedures for handover to the Femto BS. Alternatively, if setting the IWS as an initiation condition of a scanning procedure for handover as illustrated in FIGS. 14 and 15, the MS requests the macro BS to perform scanning. Then, when determining that handover is required, the MS performs a series of procedures for handover to the Femto BS.

Alternatively, if the Femto BS operates in a power saving mode, the MS proceeds to step 1913 and performs a series of procedures for making the Femto BS transit to the active mode. For example, the MS transmits an active mode transition signal to the Femto BS operating in the power saving mode. Here, the active mode transition signal includes a ranging request signal. For another example, the MS requests the macro BS to transmit an active mode transition signal to the Femto BS operating in the power saving mode.

If the Femto BS transits to the active mode, the MS proceeds to step 1915 and performs a HO procedure to the Femto BS.

Then, the MS terminates the procedure according to an exemplary embodiment of the present invention.

The following description is made for a construction of the macro BS for setting IWS configuration information and transmitting a signal considering an IWS.

Figure 20:
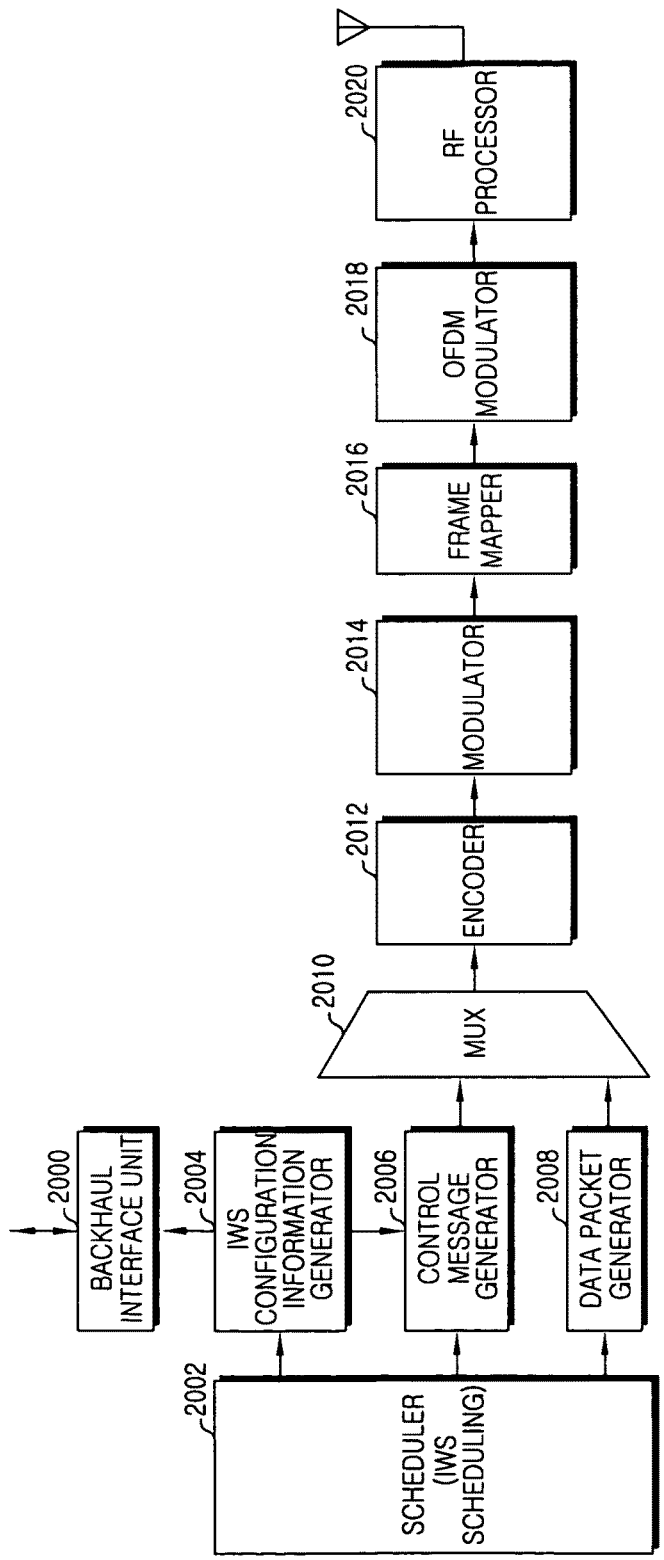
FIG. 20 illustrates a block diagram of a construction of a macro BS according to an exemplary embodiment of the present invention.

FIG. 20 illustrates a construction of a macro BS according to the present invention.

Referring to FIG. 20, the macro BS includes a backhaul interface unit 2000, a scheduler 2002, an IWS configuration information generator 2004, a control message generator 2006, a data packet generator 2008, a multiplexer (MUX) 2010, an encoder 2012, a modulator 2014, a frame mapper 2016, an Orthogonal Frequency Division Multiplexing (OFDM) modulator 2018, and a Radio Frequency (RF) processor 2020.

The scheduler 2002 allocates a resource for providing service to MSs through scheduling. At this time, the scheduler 2002 schedules the macro BS not to transmit/receive a signal during an IWS interval that is set in the IWS information generator 2004.

The IWS configuration information generator 2004 decides IWS configuration information for transmitting IWSs in Femto BSs located within a macro cell. Here, the IWS configuration information includes an IWS interval, an IWS transmission period, a length of an IWS transmission interval, and so forth. For example, if constructing a super-frame as illustrated in FIGS. 3 to 6, the IWS configuration information includes information such as a super-frame index to transmit an IWS, a position of a signal transmission resource within a super-frame, and so forth.

The backhaul interface unit 2000 transmits/receives system information with a neighbor macro BS and Femto BSs through a backhaul network. Also, the backhaul interface unit 2000 may transmit IWS configuration information, which is decided in the IWS configuration information generator 2004, to the Femto BSs located in the macro cell through the backhaul network.

The control message generator 2006 generates a control message to be transmitted to an MS located within a cell or Femto BSs. For example, the control message generator 2006 generates a broadcasting signal including IWS configuration information. Also, the control message generator 2006 generates a scanning response message including scanning interval information to be transmitted to an MS providing service, a handover response message, a ranging response message, and so forth.

The data packet generator 2008 generates a data packet to be transmitted to MSs providing service under control of the scheduler 2002.

The MUX 2010 combines and outputs a control message received from the control message generator 2006 and frame configuration elements such as a data packet received from the data packet generator 2008, and so forth.

The encoder 2012 encodes a signal received from the MUX 2010 according to a modulation level based on a wireless channel environment and outputs the encoded signal. Here, the modulation level includes a Modulation and Coding Scheme (MCS) level.

The modulator 2014 modulates the encoded signal received from the encoder 2012 according to the modulation level based on the wireless channel environment and outputs a modulation symbol.

The frame mapper 2016 maps the modulation symbol received from the modulator 2014 to a corresponding wireless resource according to scheduling information of the scheduler 2002.

The OFDM modulator 2018 converts a frequency domain signal received from the frame mapper 2016 into time domain sample data (i.e., an OFDM symbol) through Inverse Fast Fourier Transform (IFFT) and outputs the time domain sample data.

The RF processor 2020 converts a signal received from the OFDM modulator 2018 into a high frequency signal (i.e., an RF signal) and transmits the high frequency signal through an antenna.

The following description is made for a construction of the Femto BS for transmitting an IWS according to IWS configuration information.

Figure 21:
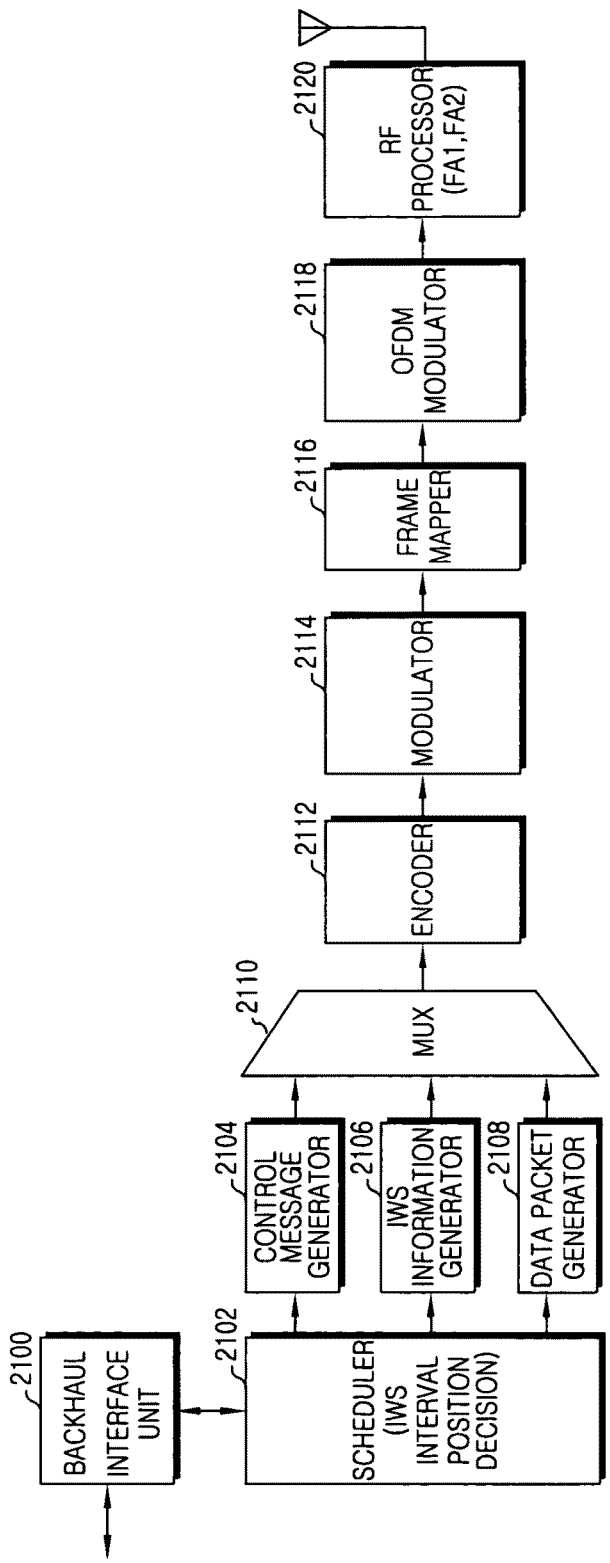
FIG. 21 illustrates a block diagram of a construction of a Femto BS according to an exemplary embodiment of the present invention.

FIG. 21 illustrates a construction of a Femto BS according to the present invention.

Referring to FIG. 21, the Femto BS includes a backhaul interface unit 2100, a scheduler 2102, a control message generator 2104, an IWS information generator 2106, a data packet generator 2108, a demultiplexer (MUX) 2110, an encoder 2112, a modulator 2114, a frame mapper 2116, an OFDM modulator 2118, and an RF processor 2120.

The backhaul interface unit 2100 can transmit/receive system information with neighbor macro BS and Femto BSs through a backhaul network. Additionally, the backhaul interface unit 2100 may receive IWS configuration information from the macro BS through the backhaul network.

Through scheduling, the scheduler 2102 allocates a resource for providing service to MSs through an operation frequency (FA2) of the Femto BS. At this time, the scheduler 2102 schedules the Femto BS to transmit an IWS using an operation frequency (FA1) of the macro BS during an IWS interval that is confirmed through the IWS configuration information.

The control message generator 2104 generates a control message to be transmitted to an MS located in a service area.

The IWS information generator 2106 generates an IWS to be transmitted through the operation frequency (FA1) of the macro BS during the IWS interval according to the IWS configuration information. For example, the IWS information generator 2106 generates an IWS including all or partial information illustrated in FIG. 10A. For another example, the IWS information generator 2106 may generate an IWS that includes identifier information of the Femto BS and power saving mode information as illustrated in FIG. 10A.

The data packet generator 2108 generates a data packet to be transmitted to MSs providing service under control of the scheduler 2102.

The MUX 2110 combines and outputs a control message received from the control message generator 2104, an IWS received from the IWS information generator 2106, and frame configuration elements such as a data packet received from the data packet generator 2108, and so forth.

The encoder 2112 encodes a signal received from the MUX 2110 according to a modulation level based on a wireless channel environment and outputs the encoded signal. Here, the modulation level includes an MCS level.

The modulator 2114 modulates the encoded signal received from the encoder 2112 according to the modulation level based on the wireless channel environment and outputs a modulation symbol.

The frame mapper 2116 maps the modulation symbol received from the modulator 2114 to a corresponding wireless resource depending on scheduling information of the scheduler 2102.

The OFDM modulator 2118 converts a frequency domain signal received from the frame mapper 2116 into time domain sample data (i.e., an OFDM symbol) through IFFT and outputs the time domain sample data.

The RF processor 2120 converts a signal received from the OFDM modulator 2118 into a high frequency signal (i.e., an RF signal) and transmits the high frequency signal through an antenna. At this time, the RF processor 2120 can transmit the signal through not only an operation frequency (FA2) of the Femto BS but also the operation frequency (FA1) of the macro BS. Thus, the RF processor 2120 converts a signal transmitted to MSs providing service to transmit the signal through the operation frequency (FA2) of the Femto BS. Also, the RF processor 2120 converts an IWS to transmit the IWS through the operation frequency (FA1) of the macro BS.

The following description is made for a construction of the MS receiving service from the macro BS for acquiring handover information to the Femto BS from an IWS.

Figure 22:
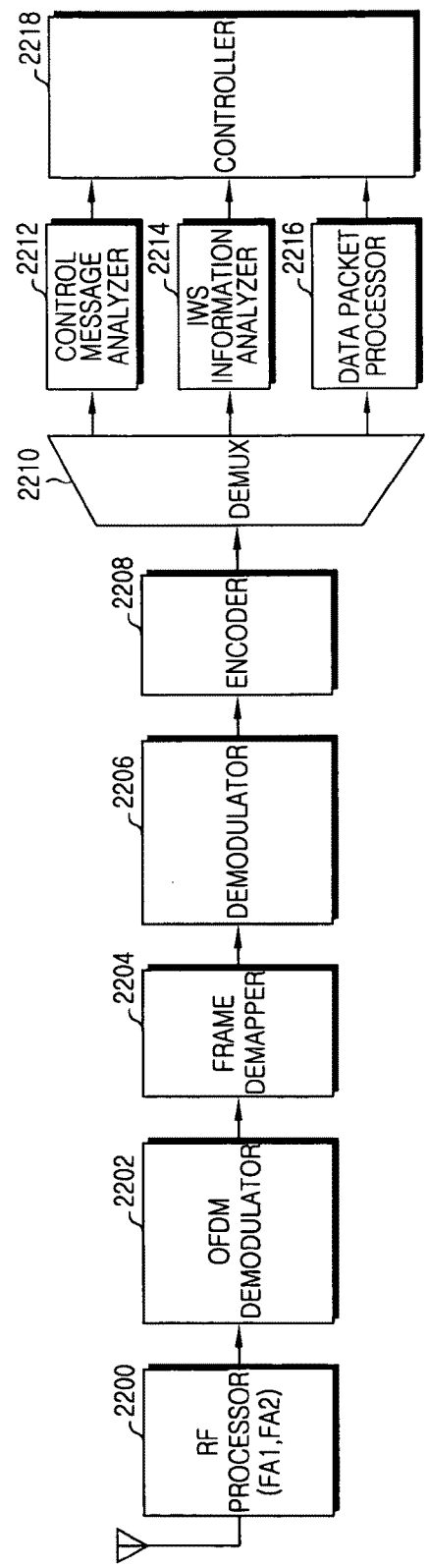
FIG. 22 illustrates a block diagram of a construction of an MS according to an exemplary embodiment of the present invention.

FIG. 22 illustrates a construction of an MS according to the present invention.

Referring to FIG. 22, the MS includes an RF processor 2200, an OFDM demodulator 2202, a frame demapper 2204, a demodulator 2206, a decoder 2208, a de-multiplexer (DE-MUX) 2210, a control message analyzer 2212, an IWS information analyzer 2214, a data packet processor 2216, and a controller 2218.

The RF processor 2200 converts a high frequency signal received through an antenna into a baseband signal and outputs the baseband signal. At this time, the RF processor 2200 controls to receive the signal through not only the operation frequency (FA1) of the macro BS but also the operation frequency (FA2) of the Femto BS. Thus, if the MS receives service from the macro BS, the RF processor 2200 operates to receive the signal through the operation frequency (FA1) of the macro BS. Alternatively, if the MS receives service from the Femto BS, the RF processor 2200 operates to receive the signal through the operation frequency (FA2) of the Femto BS.

The OFDM demodulator 2202 converts time domain sample data (i.e., an OFDM symbol) received from the RF processor 2200 into a frequency domain signal through Fast Fourier Transform (FFT) and outputs the frequency domain signal.

The frame demapper 2204 demaps only data received by the MS from the signal received from the OFDM modulator 2202, and outputs the demapped data.

The demodulator 2206 demodulates a signal received from the frame demapper 2204 and outputs the demodulated signal. The decoder 2208 decodes the signal demodulated in the demodulator 2206 and outputs the decoded signal.

The DEMUX 2210 separates the signal received from the decoder 2208 by frame construction element and transmits the signal to a corresponding module. For example, the DEMUX 2210 transmits a control message to the control message analyzer 2212, transmits an IWS to the IWS information analyzer 2214, and transmits a data packet to the data packet processor 2216.

The control message analyzer 2212 confirms control information transmitted by a serving BS in the control message received from the DEMUX 2210. For example, the control message analyzer 2212 confirms resource allocation information allocated from the macro BS, in the resource allocation message. Also, the control message analyzer 2212 confirms scanning interval information allocated by the serving BS in a scanning response message. The control message analyzer 2212 confirms a BS ID of a Femto BS, operation frequency information of the Femto BS, and preamble sequence information of the Femto BS in a handover response message.

If receiving an IWS from the DEMUX 2210, the IWS information analyzer 2214 determines that the MS can handover to a Femto BS. Also, the IWS information analyzer 2214 can determine identifier information of the Femto BS transmitting the IWS and if the Femto BS operates in a power saving mode, through the IWS.

The data packet processor 2216 processes a data packet received from the DEMUX 2210 and transmits the data packet to the controller 2218.

The controller 2218 controls the whole operation of the MS depending on control information received from the control message analyzer 2212 and the IWS information analyzer 2214. For example, the controller 2218 controls an operation frequency of the RF processor 2200 depending on a serving BS. Also, the controller 2218 provides resource information to be demapped by the frame demapper 2204 through the resource allocation information received from the control message analyzer 2212. Also, the controller 2218 controls whether to handover to the Femto BS through the identifier information and power saving mode information of the Femto BS received from the IWS information analyzer 2214.

By providing an IWS including identifier information to an MS in a cell of a small service area size in a wireless communication system in which cells of service areas of different sizes are mixed and managed as described above, the present invention has an advantage that an overhead caused by transmission of neighbor cell information can be reduced, an MS can recognize a handover time without scanning, and the MS easily recognizes power saving mode information on a BS of a cell of a service area of a small size, thus facilitating power saving mode transition of the BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting cell information by a femto Base Station (BS) of a small cell in a wireless communication environment in which a communication system of a large cell and another communication system of the small cell are hierarchically configured in the same area, the method comprising:
receiving, by the femto BS, transmission information from a macro BS of a large cell;
identifying a transmission interval in the received transmission information; and
transmitting a reference signal using an operating frequency of the macro BS at the transmission interval,
wherein the reference signal includes femto BS information, and
wherein the femto BS is located within a service area of the macro BS.

2. The method of claim 1, wherein the femto BS information comprises at least one of a cell identifier, a Closed Subscriber Group (CSG) identifier, a frequency of the femto BS, a frequency channel number of the femto BS, a preamble sequence index of the femto BS, a signal bandwidth of the femto BS, service level prediction information that can be provided by the femto BS, operation state information of the femto BS, and active mode transition information of the femto BS.

3. The method of claim 1, wherein transmitting the reference signal comprises transmitting the reference signal using a whole or a portion of the operating frequency of the macro BS during the transmission interval.

4. The method of claim 1, wherein the transmission interval is set using a partial resource of a frame comprising the transmission interval.

5. A method for handover of a Mobile Station (MS) in a wireless communication environment in which a communication system of a large cell and another communication system of a small cell are hierarchically configured in the same area, the method comprising:
communicating with a macro base station (BS) of the large cell;
receiving a reference signal from a femto BS of the small cell using a whole or a portion of an operating frequency of the macro BS at a transmission interval determined by the macro BS;
determining a femto BS information of the femto BS through the reference signal; and
performing a handover to the femto BS using the femto BS.

6. The method of claim 5, wherein the femto BS information comprises at least one of a cell identifier, a Closed Subscriber Group (CSG) identifier, a frequency of the femto BS or a frequency channel number, a preamble sequence index of the femto BS, a signal bandwidth of the femto BS, service level prediction information that can be provided by the femto BS, operation state information of the femto BS, and active mode transition information of the femto BS.

7. The method of claim 5, further comprising:
after confirming the femto BS information, confirming operating state information of the femto BS using the femto BS information;
when the femto BS operates in a power saving mode, making the femto BS transit to an active mode; and when the BS operates in the active mode, performing a handover to the femto BS.

8. The method of claim 7, wherein making the femto BS transit to the active mode comprises requesting the macro BS for active mode transition of the femto BS of the small cell.

9. The method of claim 7, wherein making the femto BS transit to the active mode comprises requesting the femto BS for active mode transition.

10. The method of claim 5, wherein the handover comprises:
performing scanning using the cell information;
deciding whether to perform handover according to the scanning result; and
when deciding to perform handover, performing handover to the femto BS selected by the scanning.

11. An apparatus configured to transmit cell information in a femto Base Station (BS) of a small cell in a wireless communication environment in which a communication system of a large cell and another communication system of the small cell are hierarchically configured in the same area, the apparatus comprising:
a reference signal generator configured to generate a reference signal for the femto BS;
a scheduler configured to schedule, during a transmission interval, transmission of the reference signal using an operating frequency of a macro BS of the large cell; and
a transmitter configured to transmit the reference signal using the operating frequency of the macro BS during the transmission interval according to the scheduling information,
wherein the reference signal includes femto BS information,
wherein the BS is located within service area of the macro BS, and
wherein the transmission interval is identified in transmission information received from the macro BS.

12. The apparatus of claim 11, wherein the reference signal generator is configured to generate a reference signal that comprises at least one of a cell identifier, a Closed Subscriber Group (CSG) identifier, a frequency of the femto BS or a frequency channel number, a preamble sequence index of the femto BS, a signal bandwidth of the femto BS, service level prediction information that can be provided by the femto BS, operation state information of the femto BS, and active mode transition information of the femto BS.

13. The apparatus of claim 11, wherein the transmitter is configured to transmit the reference signal using a whole or a portion of the operating frequency of the macro BS during the transmission interval.

14. The apparatus of claim 11, wherein the transmitter is configured to transmit the reference signal during the transmission interval that is set using a partial resource of a frame comprising the transmission interval.

15. An apparatus configured to perform a handover of a Mobile Station (MS) in a wireless communication environment in which a communication system of a large cell and another communication system of a small cell are hierarchically configured in the same area, the apparatus comprising:
a receiver configured to receive a first signal;
a transmitter configured to transmit a second signal;
a reference signal analyzer configured to:
determine a femto base station (BS) information of a femto BS of a small cell through the reference signal when communicating with the macro BS of a large cell, wherein the reference signal is received from the femto BS using a whole or a portion of an operating frequency of the macro BS at a transmission interval determined by the macro BS, and
a controller configured to control the handover to the femto BS using the femto BS information.

16. The apparatus of claim 15, wherein the reference signal analyzer is configured to acquire, from the reference signal, the femto BS information that comprises at least one of a cell identifier, a Closed Subscriber Group (CSG) identifier, a frequency of the femto BS or a frequency channel number, a preamble sequence index of the femto BS, a signal bandwidth of the femto BS, service level prediction information that can be provided by the femto BS, operation state information of the femto BS, and active mode transition information of the femto BS.

17. The apparatus of claim 15, wherein, when the femto BS is configured to operate in a power saving mode according to the acquired femto BS information, the controller is configured to:
control the femto BS to transit to an active mode, and
when the femto BS operates in the active mode, perform a handover to the femto BS.

18. The apparatus of claim 17, wherein, when the controller controls the femto BS to transit to the active mode, the controller is configured to request the macro BS for active mode transition of the femto BS.

19. The apparatus of claim 17, wherein, when the controller controls the femto BS to transit to the active mode, the controller is configured to request the femto BS for active mode transition.

20. The apparatus of claim 15, wherein, when acquiring the femto BS information from the reference signal analyzer, the controller is configured to scan a neighbor cell using the femto BS information, decide whether to perform handover according to the scanning result, and, when deciding to perform handover, perform a handover to the femto BS selected by the scanning.

* * * * *